(12) United States Patent
Liu et al.

(10) Patent No.: US 9,918,250 B2
(45) Date of Patent: Mar. 13, 2018

(54) DATA COMMUNICATION VIA DATA PACKET HEADERS

(71) Applicant: Tencent Technology (Shenzhen) Company Limited, Shenzhen (CN)

(72) Inventors: Chenglin Liu, Shenzhen (CN); Liangliang Fan, Shenzhen (CN); Kai Liu, Shenzhen (CN); Xiangyao Lin, Shenzhen (CN); Can Liu, Shenzhen (CN); Rungui Ye, Shenzhen (CN); Lejun Liu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 147 days.

(21) Appl. No.: 14/973,474

(22) Filed: Dec. 17, 2015

(65) Prior Publication Data

US 2016/0112901 A1 Apr. 21, 2016

Related U.S. Application Data

(63) Continuation of application No. PCT/CN2014/092652, filed on Dec. 1, 2014.

(30) Foreign Application Priority Data

Dec. 4, 2013 (CN) .......................... 2013 1 0649198

(51) Int. Cl.
*H04W 28/06* (2009.01)
*H04L 29/06* (2006.01)
(Continued)

(52) U.S. Cl.
CPC ....... *H04W 28/065* (2013.01); *H04L 12/6418* (2013.01); *H04L 63/0428* (2013.01);
(Continued)

(58) Field of Classification Search
CPC ............. H04W 28/065; H04L 12/6418; H04L 63/0428; H04L 69/08; H04L 69/22
See application file for complete search history.

(56) References Cited

U.S. PATENT DOCUMENTS

2006/0039341 A1* 2/2006 Ptasinski ................. H04L 63/12
370/338
2008/0046545 A1* 2/2008 Koren ...................... H04L 12/66
709/220
(Continued)

FOREIGN PATENT DOCUMENTS

CN 1531260 A 9/2004
CN 101471937 A 7/2009
(Continued)

OTHER PUBLICATIONS

Tencent Technology, ISRWO, PCT/CN2014/092652, Mar. 2, 2015, 8 pgs.
(Continued)

*Primary Examiner* — Ricky Ngo
*Assistant Examiner* — Stephen Steiner
(74) *Attorney, Agent, or Firm* — Morgan, Lewis & Bockius LLP

(57) ABSTRACT

This application discloses a data communication method implemented at an electronic device. The electronic device obtains a sequence of data packets. Each data packet complies with a first data format corresponding to a network access protocol and comprises a respective header that further includes a data length field for specifying a length of the respective data packet. Data are then assigned to the data length fields of the sequence of data packets according to a second data format. The electronic device encrypts the sequence of data packets including the assigned data. The encrypted data packets are then sent to a receiver device that is communicatively coupled to the electronic device via a wireless network. The receiver device is configured to retrieve the assigned data from the data length fields of the data packets according to the first and second data formats and perform operations in accordance with the retrieved data.

20 Claims, 13 Drawing Sheets

(51) Int. Cl.
*H04L 12/64* (2006.01)
*H04W 12/02* (2009.01)

(52) U.S. Cl.
CPC .............. *H04L 69/08* (2013.01); *H04L 69/22* (2013.01); *H04W 12/02* (2013.01)

(56) References Cited

U.S. PATENT DOCUMENTS

2008/0056216 A1* 3/2008 Zimmerman ......... H04W 48/10
370/338
2014/0196142 A1* 7/2014 Louboutin .............. G06F 21/44
726/16

FOREIGN PATENT DOCUMENTS

| | | |
|---|---|---|
| CN | 101488954 A | 7/2009 |
| CN | 103237313 A | 8/2013 |
| CN | 103327030 A | 9/2013 |
| CN | 104144034 A | 11/2014 |
| CN | 104144086 A | 11/2014 |
| WO | WO 2008030877 A2 | 3/2008 |

OTHER PUBLICATIONS

Tencent Technology, IPRP, PCT/CN2014/092652, Jun. 7, 2016, 6 pgs.

* cited by examiner

10

32

34

| | | | | | | | |
|---|---|---|---|---|---|---|---|
| 0 | x | x | x | Length (high) | | | |
| 0 | x | x | x | Length (low) | | | |
| 0 | x | x | x | Data Integrity (high) | | | |
| 0 | x | x | x | Data Integrity (low) | | | |
| 0 | x | x | x | Receiver ID 1 | | | |
| 0 | x | x | x | Receiver ID 2 | | | |
| 0 | x | x | x | Receiver ID 3 | | | |
| 0 | x | x | x | Receiver ID 4 | | | |
| 1 | 1 | 1 | 1 | 1 | 1 | 1 | 1 |
| 1 | 1 | Sequence Integrity (Lower 6 bits) | | | | | |
| 1 | 1 | Sequence Index | | | | | |
| 1 | 0 | SSID Password 1 | | | | | |
| 1 | 0 | SSID Password 2 | | | | | |
| 1 | 0 | Random Number 1 | | | | | |
| 1 | 0 | Random Number 2 | | | | | |
| 1 | 0 | SSID 1 | | | | | |
| 1 | 0 | SSID 2 | | | | | |
| 1 | 1 | Sequence Integrity (Lower 6 bits) | | | | | |
| 1 | 1 | Sequence Index | | | | | |
| 1 | 0 | Instruction ID 1 | | | | | |
| 1 | 0 | Instruction ID 2 | | | | | |
| 1 | 0 | Instruction ID 3 | | | | | |
| 1 | 0 | Instruction Information | | | | | |
| 1 | 0 | Instruction Information | | | | | |
| 1 | 0 | Instruction Information | | | | | |

- Data Control Header 402
- Prefix Code Field 404
- Data Sequence Field 406
  - Sequence Header Field 406A
  - Data Field 406B
- Data Sequence Field 408
  - Sequence Header Field 408A
  - Data Field 408B

At a receiver device having one or more processors and memory storing program modules to be executed by the one or more processors:

⎯ 60

Obtains a sequence of data packets from a receiver device that is communicatively coupled to the receiver device via a wireless network 602

Decrypting the sequence of data packets, wherein each decrypted data packet complies with a first data format corresponding to a network access protocol and comprises a respective header that further includes a data length field for specifying a length of the respective decrypted data packet 604

Retrieving data from the data length fields of the sequence of decrypted data packets according to a second data format distinct from the first data format 606

Performing operations in accordance with the retrieved data 608

FIG. 6

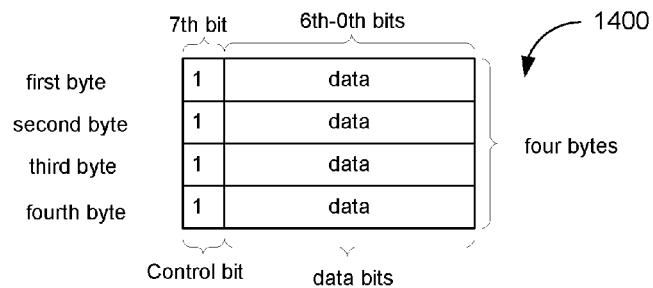
FIG. 14
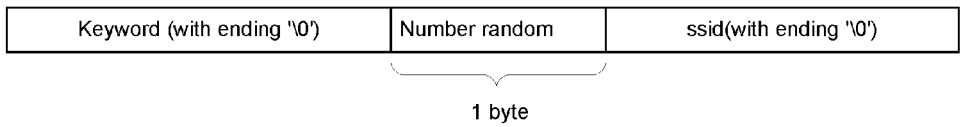
FIG. 15
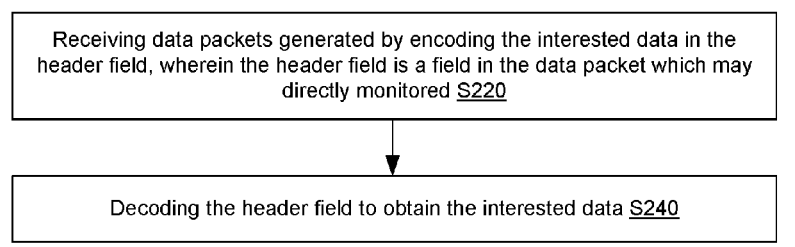
FIG. 16
| WIFI encryption manner | The difference between the length of the UDP broadcast packet sent by the sending end and the value of field Length monitored by the receiving end |
|---|---|
| AES | 52 |
| TKIP | 56 |
| RC4 | 44 |
FIG. 17

| Sending times | Probability of successful sending information with the accumulation error correction algorithm | Probability of successful sending information without the accumulation error correction algorithm |
|---|---|---|
| 1 | 3% | 3% |
| 2 | 81% | 3% |
| 3 | 98% | 3% |
| 4 | 99.9% | 3% |
| 5 | 99.999% | 3% |

| DA | SA | Length | LLC | DATA | FCS |
|---|---|---|---|---|---|

| DA | SA | Length | DATA | FCS |
|---|---|---|---|---|

DATA COMMUNICATION VIA DATA PACKET HEADERS

RELATED APPLICATIONS

This application is a continuation application of PCT Patent Application No. PCT/CN2014/092652, entitled "DATA COMMUNICATION VIA DATA PACKET HEADERS" filed on Dec. 1, 2014, which claims priority to Chinese Patent Application No. 201310649198.1, entitled "Communication method, communication system and information sending/receiving apparatus" filed on Dec. 4, 2014, both of which are incorporated by reference in their entirety.

TECHNICAL FIELD

The disclosed implementations relate generally to data communication technology, and in particular, to communicating specific data (such as identification numbers, passwords and instructions) to a receiver device over a wireless network and thereby controlling the receiver device remotely.

BACKGROUND

As network technology develops, a large number of electronic devices (such as computers, mobile phones and small appliances) are communicatively coupled on a wireless network. Sometimes, a peripheral communication component may be further integrated in an electronic device to allow it to communicate with other electronic devices and receive useful data. For example, an electronic device may also include a Bluetooth module, a near field communication module or the like. However, usage of such a peripheral communication component increases the cost of the electronic device, while communication based on the component are not necessarily made more convenient. Therefore, there is a need to take advantage of existing wireless networks to deliver useful data to electronic devices efficiently without resorting to any peripheral communication component.

SUMMARY

The above deficiencies and other problems associated with the conventional approaches of network communication are reduced or eliminated by the application disclosed below. In some embodiments, the application is implemented in an electronic device that has one or more processors, memory and one or more modules, programs or sets of instructions stored in the memory for performing multiple functions. Instructions for performing these functions may be included in a computer program product configured for execution by one or more processors.

One aspect of the application is a data communication method implemented at an electronic device. The method includes obtaining a sequence of data packets, wherein each data packet complies with a first data format corresponding to a network access protocol and includes a respective header that further includes a data length field for specifying a length of the respective data packet. The method further includes assigning data to the data length fields of the sequence of data packets according to a second data format and encrypting the sequence of data packets that include the assigned data. The method further includes sending the sequence of encrypted data packets to a receiver device that is communicatively coupled to the electronic device via a wireless network, wherein the receiver device is configured to retrieve the assigned data from the data length fields of the sequence of data packets according to the first and second data formats and perform operations in accordance with the retrieved data.

Another aspect of the application is a data processing method implemented at an electronic device. The method includes obtaining a sequence of data packets from a receiver device that is communicatively coupled to the receiver device via a wireless network and decrypting the sequence of data packets. Each decrypted data packet complies with a first data format corresponding to a network access protocol and includes a respective header that further includes a data length field for specifying a length of the respective decrypted data packet. The method includes retrieving data from the data length fields of the sequence of decrypted data packets according to a second data format distinct from the first data format, and performing operations in accordance with the retrieved data.

Another aspect of the application is an electronic device that includes one or more processors and memory having at least one program (including instructions) stored thereon, which when executed by the one or more processors cause the processors to perform operations to obtain a sequence of data packets. Each data packet complies with a first data format corresponding to a network access protocol and includes a respective header that further includes a data length field for specifying a length of the respective data packet. The at least one program further includes instructions to assign data to the data length fields of the sequence of data packets according to a second data format and encrypt the sequence of data packets that include the assigned data. The at least one program further includes instructions to send the sequence of encrypted data packets to a receiver device that is communicatively coupled to the electronic device via a wireless network, wherein the receiver device is configured to retrieve the assigned data from the data length fields of the sequence of data packets according to the first and second data formats and perform operations in accordance with the retrieved data.

Other embodiments and advantages may be apparent to those skilled in the art in light of the descriptions and drawings in this specification.

BRIEF DESCRIPTION OF DRAWINGS

The aforementioned implementation of the present disclosure as well as additional implementations will be more clearly understood as a result of the following detailed description of the various aspects of the present disclosure when taken in conjunction with the drawings.

FIG. 4B illustrates exemplary assigned data that are configured according to the second data format shown in FIG. 4A in accordance with some embodiments.

FIG. 6 illustrates a flow chart of another exemplary data processing method that processes data received at a receiver device in accordance with some embodiments.

FIGS. 12, 13 and 14 are schematic diagrams of a magic code field, a sequence header and a data field that are configured based on a link layer data structure in accordance with some embodiments, respectively.

FIG. 15 is a schematic diagram of a data field including a SSID, a SSID password and a random number in accordance with some embodiments.

FIG. 16 is a flow chart of another exemplary data communication method in accordance with some embodiments.

FIG. 17 is a modification table showing differences of data packet lengths of data packets that are sent by a master device and monitored by a receiver device, respectively, in accordance with some embodiments.

Like reference numerals refer to corresponding parts throughout the drawings.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. The appended drawings, however, merely illustrate the more pertinent features of the present disclosure and are therefore not to be considered limiting, for the description may admit to other effective features. In other instances, well-known methods, procedures, components, and circuits have not been described in detail so as not to unnecessarily obscure aspects of the embodiments.

The technical scheme of the embodiment of the application will now be described in connection with the accompanying drawings in some embodiments of the application. Obviously, some but not all embodiments of the application are described. Based on the embodiments of the application, other embodiments obtained by people having ordinary skill in the art are also included in the protective scope of the application.

Unless there is special definition, all the present application technique and science terms used herein have the same meanings as those understood by the skilled of the technique field of the present application. The terms used herein for the description of password sharing and acquiring methods and systems are merely for describing particular embodiments, but not intended to limit the application. The term "and/or" used herein means any combination of one or more listed items.

Figure 1:
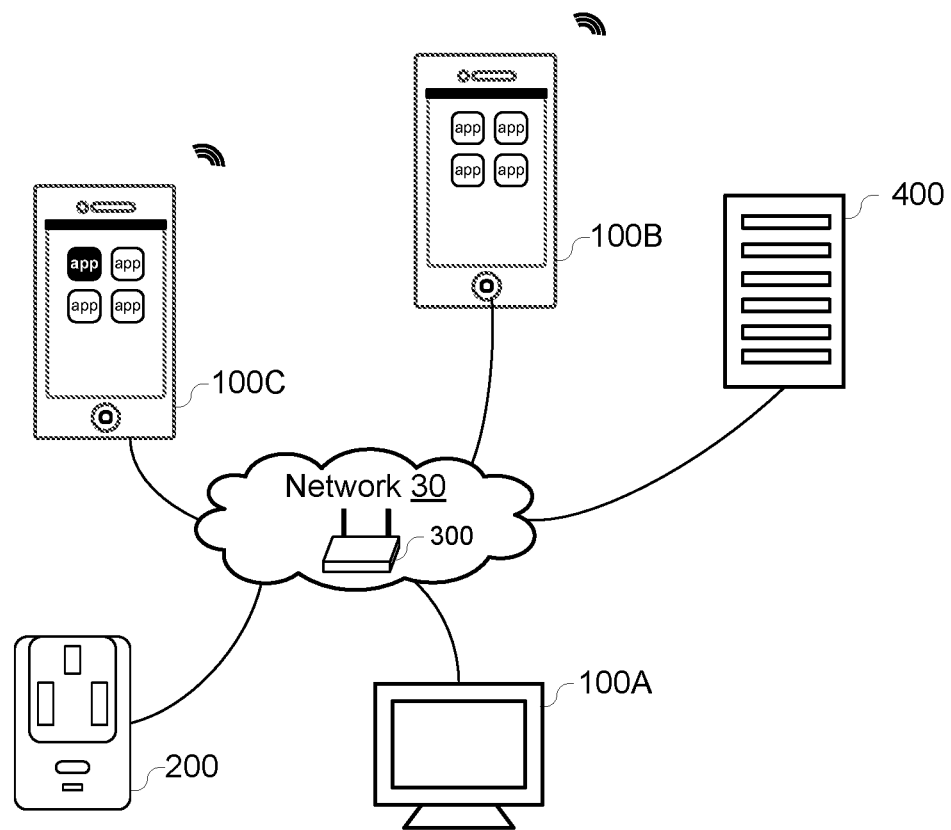
FIG. 1 illustrates an exemplary service set that includes a plurality of electronic devices associated with a communication network in accordance with some embodiments.

FIG. 1 illustrates an exemplary service set 10 that includes a plurality of electronic devices (e.g., devices 100, 200 and 400) associated with a communication network 30 in accordance with some embodiments. The electronic devices are communicatively coupled on communication network 30 via a wireless access point (AP) 300. Each of the electronic devices may preferably include, but is not limited to, a desktop or laptop computer 100A, a mobile phone 100B or 100C, a tablet computer, or a Personal Digital Assistant (PDA). Service set 10 also includes a server 400 which may also be regarded as an electronic device. Communication network 30 includes, but in not limited to, the Internet, intranets, local area networks (LANs), cellular networks, Ethernet, Storage Area Networks (SANs), telephone networks, Bluetooth communication and the like.

Service set 100 is associated with a service set identifier (SSID) that differentiates communication network 30 from any other communication network. Access point 300 and electronic devices 100, 200 and 400 must use the same SSID to access the same communication network (e.g., network 30). In one specific example, a SSID is a unique identifier that includes 32 case sensitive alphanumeric characters, and acts as a password when a mobile device (e.g., device 100B) tries to connect to service set 10 associated with communication network 30. Under some circumstances, the SSID is attached to a header of every data packet sent over communication network 30.

In some implementations, the SSID of service set 100 is further associated with a SSID password. An electronic device has to provide both the SSID and the SSID password to connect to service set 10 associated with communication network 30. An electronic device not only has to encode a data packet according to the SSID and the SSID password before it distributes the data packet on communication network 30, but also has to decode a data packet when it receives the data packet via communication network 30 according to the SSID and the SSID password.

In many embodiments, the SSID and the SSID password are defined for an electronic device included in service set 10 based on a user's input, selection or confirmation. However, as discussed in the background of the application, some electronic devices (e.g., device 200) do not include a keyboard or a touch display that allows a user to manually input the SSID and/or the SSID password. In accordance with some embodiments of this application, such electronic devices receive the SSID and the SSID password from another electronic device that is included in the same service set 10 associated with communication network 30. The receiver devices thereby recover the SSID and the SSID password from one or more data packets transferred from the other electronic device. The recovered SSID information is then used to decode data packets received at the receiver devices via communication network 30 and encode data packets that are broadcasted by the receiver devices.

In one specific example, a receiver device is a smart sensor device that is controlled by another master computer for wireless energy management. The smart sensor device is plugged onto a wall power outlet. Due to its small form factor and low cost requirements, the smart sensor device may include a limited number of control switches or buttons, but does not include any display or keyboard. This smart sensor device has to rely on a communication network to receive instructions from the master computer and return sensing data back to the master computers for further analysis. Therefore, the smart sensor device has to receive the SSID information to access the communication network for the purposes of receiving the instructions and returning the sensing data.

Despite this specific example, one of those skilled in the art may see that, in some embodiments, a receiver device may include an input/output interface for receiving the input of the SSID or the SSID password, but chooses to receive the SSID or the SSID password from another electronic device of service set 10.

In accordance with some embodiments of this application, a SSID data set (including the SSID and the SSID password) is coded in a specific header field of a data packet. When the specific header field of one data packet is not sufficient to include all information of the SSID data set, a sequence of data packets are involved, and the SSID data set is coded in the specific header fields of multiple data packets based on a specific link layer data structure. The specific header fields includes either plain texts that are not encrypted or encrypted data that are encrypted with an encryption method that is known to a receiver device. As such, when it is first coupled to communication network 30, the receiver device may conveniently receive the SSID data set from another master device, recovers the SSID and the SSID password, and obtain an authorized access to communication network 30.

Further, in some embodiments, regardless of how the SSID or the SSID password associated with a service set 10 are obtained by a receiver device, the receiver device receives instructions via network 30 from another electronic device that also belongs to the same service set, and performs operations according to the received instructions. In accordance with some embodiments of this application, data associated with an instruction are coded in a specific header field of a data packet. When the specific header field of one data packet is not sufficient to include all information associated with the instruction, a sequence of data packets are involved, and the data associated with the instruction are coded in the specific header fields of multiple data packets based on a data format (i.e., a specific link layer data structure) that is distinct from a data format of the data packet. The specific header fields include either plain data that are not encrypted or encrypted data that are encrypted with an encryption method known to the receiver device.

In one specific example, each specific header field includes a data length field that specifies a length of a respective data packet, and data that are communicated to a receiver device are assigned to data length fields in headers of a sequence of data packets.

Figure 2B:
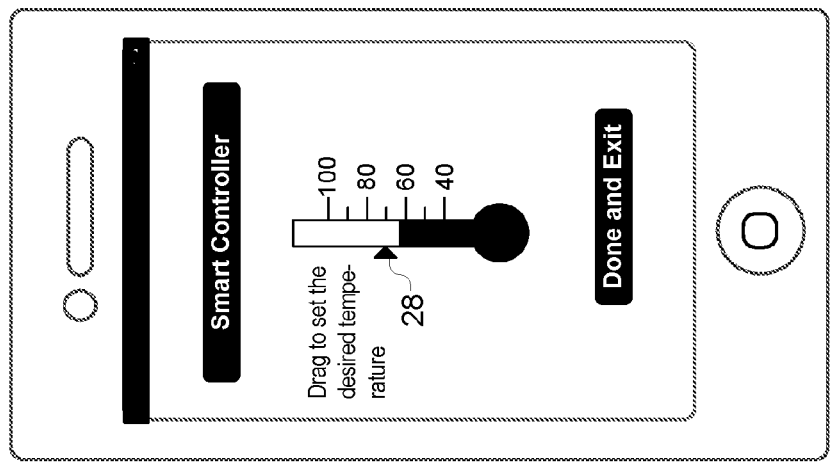
FIG. 2B illustrates an exemplary user interface that is used to generate instructions that control a receiver device in accordance with some embodiments.
Figure 2A:
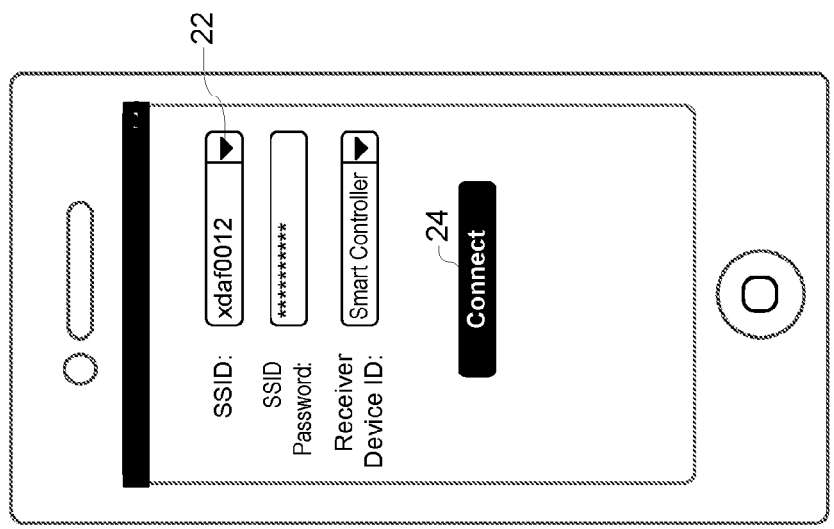
FIG. 2A illustrates an exemplary user interface that receives user inputs of a SSID, a SSID password, a receiver device identifier, and a SSID share request in accordance with some embodiments.

FIG. 2A illustrates an exemplary user interface 20 that receives user inputs of a SSID, a SSID password, a receiver device identifier, and a SSID share request in accordance with some embodiments. The user interface 20 is displayed on a master electronic device that provides the SSID data set to a receiver device. Optionally, a user of the master device manually inputs the SSID or the SSID password of service set 10. Optionally, the user clicks on items 22 to open a list of SSIDs each of which is associated with an available communication network, and then chooses one of these SSIDs.

In some embodiments, the receiver device that is designated to receive the SSID data set is uniquely associated with a receiver device identifier. The receiver device identifier is often assigned by the manufacturer of the receiver device and provided upon the sale of the receiver device. The user of the master device optionally inputs the receiver device identifier, or selects a receiver device identifier from a list of receiver device identifiers.

Then, the user issues a SSID share request by clicking on a button 24. Upon receiving the SSID share request, the master device includes the SSID and the SSID password in a specific data field of one or more data packets based on a link layer data structure. The one or more data packets including the SSID data set is then communicated to the receiver device.

Assume the receiver device obtains the SSID data set requested based on user interface 20 and gains authorized access to communication network 30.

FIG. 2B illustrates an exemplary user interface 26 that is used to generate instructions that control a receiver device in accordance with some embodiments. In some embodiments, the receiver device accesses a network 30 by receiving the SSID and the SSID password from a master electronic device as shown in FIG. 2A. In some embodiments, the receiver device obtains the SSID and the SSID password from an alternative source.

The user interface 26 is displayed on a master electronic device. In this example, the receiver device returns temperature data to the master electronic device via communication network 30, and such temperature data are displayed on user interface 26. In some embodiments, a user of the master device sets forth a target temperature by dragging a tick 28 on user interface 26, and click button "Done and Exit" to issue a temperature control command to the receiver device via communication network 30. Then, when the receiver device receives one or more data packets via communication network 30, it retrieves the temperature control command from header fields of the data packets by decoding the data packets according to predetermined data formats of the data packets.

In some implementations, user interfaces 20 and 26 are included in a social network platform, such as WeChat, WhatsApp, Link and Facebook. A user may directly access and control an electronic device via such user interfaces of this social network platform.

Figure 3A:
FIG. 3A illustrates an exemplary data format corresponding to a network access protocol (e.g., IEEE 802.2 SNAP) in accordance with some embodiments.

FIG. 3A illustrates an exemplary data format 32 corresponding to a network access protocol (e.g., IEEE 802.2

Figure 3B:
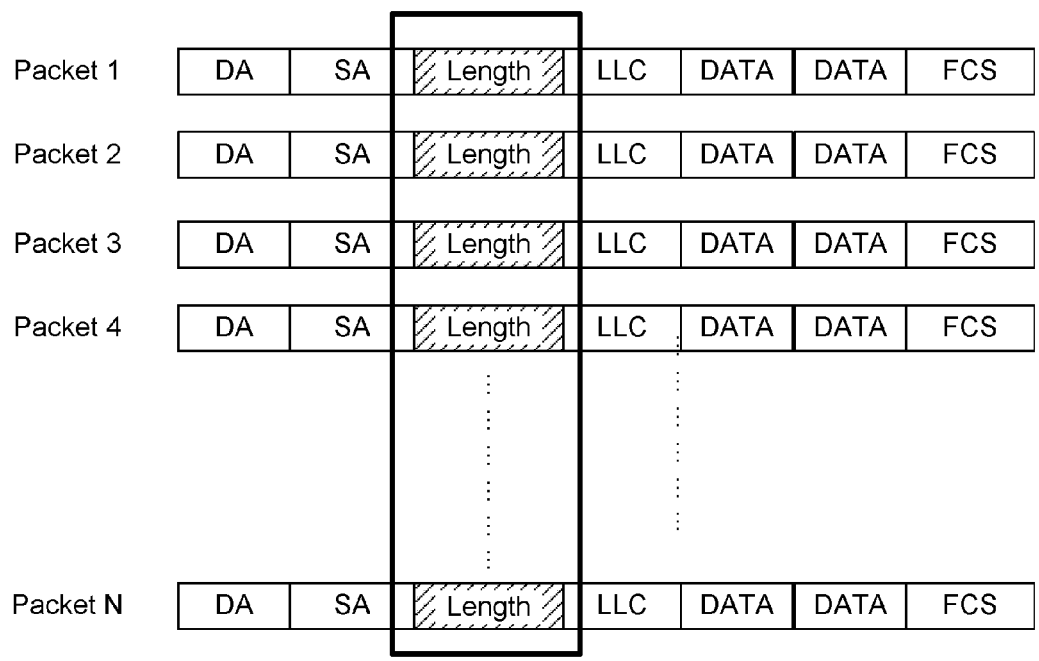
FIG. 3B illustrates a sequence of data packets each of which has a first data format corresponding to a network access protocol (e.g., IEEE 802.2 SNAP) in accordance with some embodiments.

SNAP) in accordance with some embodiments, and FIG. 3B illustrates a sequence of data packets 34 each of which has a first data format corresponding to a network access protocol (e.g., IEEE 802.2 SNAP) in accordance with some embodiments. Here, data packets are configured according to data format 32, when they are communicated on a communication network based on the network access protocol. According to data format 32, a data packet includes a packet header, two data fields (DATA) and a frame check sequence (FCS). In this specific example, the packet header further includes a destination address (DA) field, a source address (SA) field, a length field, and a logical link control (LLC) field. The data fields include data (such as the above temperature control command). The frame check sequence includes integrity data that are generated from the data of the data field according to an integrity check method. A receiver device determines whether the data of the data field are accurate and consistent with original data generated at the master device based on the frame check sequence.

In some implementations, the data of the data field are encrypted, and however, a receiver device cannot decrypt the data of the data field without the SSID or the SSID password associated with communication network 30. However, the packet header is either unencrypted or encrypted with a known encryption method, such that the receiver device may easily extract information contained in the packet header without using the SSID data set.

In accordance with some embodiments of the application, a data field (e.g., a data length field) in the packet header is used to communicate interested data, such as the SSID, the SSID password, or instruction data, to a receiver device. The receiver device receives and decodes data packets over communication network 30, and retrieves the interested data from the designated data fields in the packet headers of the data packets. In one example, the data length fields of the packet headers are used to communicate the SSID data set (including the SSID or the SSID password), and the data fields (DATA) of the subsequent data packets are used to transfer commands (e.g., the temperature control command in FIG. 2B) for controlling the receiver device. However, in another example, the data length fields of the packet headers are used to communicate instruction data (e.g., the temperature control command in FIG. 2B) directly for controlling the receiver device.

Figure 4A:
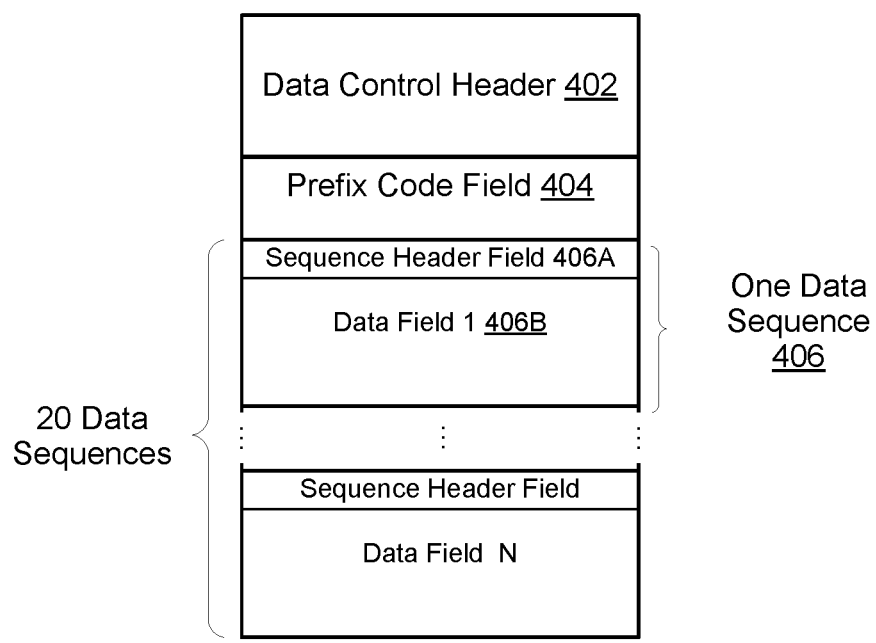
FIG. 4A illustrates an exemplary second data format (e.g., a link layer data structure) used to assign data into data packet headers in accordance with some embodiments.

In some implementations, the interested data (e.g., the SSID data set or the instruction data) are coded in a respective header field (e.g., a data length field) of each packet of the data packet sequence 34 based on a link layer data structure. FIG. 4A illustrates an exemplary second data format 40 (e.g., a link layer data structure) used to assign data into data packet headers in accordance with some embodiments, and FIG. 4B illustrates exemplary assigned data 42 that are configured according to the second data format shown in FIG. 4A in accordance with some embodiments. In accordance with link layer data structure 40, the respective header fields of the data packet sequence 34 together include assigned data 42. In some embodiments, assigned data 42 include a number of data words having a fixed width (e.g., eight bits).

In accordance with second data format 40, assigned data include a data control header 402, a prefix code field 404, and a number of data sequences 406, and each data sequence further includes a sequence header 406A and a data field 406B. Optionally, data control header 402 defines one or more of a data length, a data integrity word and an identifier of a receiver device. Specifically, as shown in FIG. 4B, data control header 402 includes 8 bytes each of which includes 8 bits of data. The highest four bits are reserved for identifying these eight bytes as data control header 402, and in particular, the highest bit has a fixed value of "1." The lowest four bits of these eight bytes are used to define the relevant information, e.g., two bytes for the data length, two bytes for data integrity, and four bytes for the receiver identifier.

In some embodiments, the data length included in data control header 402 is the total length of assigned data 42 or the length of data control header 402. In this application, data control header 402 is also called as a magic code field.

Prefix code field 404 is followed by a number of data sequences, and therefore, it is used to indicate a start of such data sequences. In a specific example, a byte including eight bits of "1" is used to fill prefix code field 404.

In the specific example as shown in FIG. 4B, first data sequence field 406 includes one data sequence that has a length of 8 bytes, including two bytes of sequence header field 406A and six bytes of data field 406B. To differentiate from data control header 402, each byte in data sequence field 406 starts with "1." Specifically, the highest two bits of sequence header field 406A are "11," and the highest two bits of data field 406B are "10." Further, the two bytes of sequence header field 406A includes a sequence integrity word and a sequence index, respectively. The sequence integrity word is generated from the data in data field 406B based on a data integrity check method, and thereby used to maintain the accuracy of the data in data field 406B. The sequence index is used to locate the specific data sequence within data sequence field 406, when data sequence field 406 includes two or more data sequences.

In some implementations, data field 406B includes at least a part of the SSID data set (including the SSID and the SSID password). When the SSID data set is relatively long and cannot be delivered within six bytes (i.e., more than one data sequence), the SSID data set are included in two or more data sequences in data set 40 with each data sequence identified with a sequence header field 406A. In some embodiments, the SSID data set is so long that it cannot be delivered within all the data sequences of 406 of one data set 40, and two or more data sets 40 having their respective data control headers and prefix code fields are used to transmit the SSID data set. As such, two or more data packets 34 are involved to include the long SSID data set and deliver it to the receiver device.

In some embodiments, the SSID data set includes a SSID of a service set associated with a communication network, a corresponding SSID password, and a random number. When a receiver device receives the random number, it broadcasts the random number back to a master device that sends the SSID data set to the receiver device and confirms to the master device that it has received the SSID data set.

In the example shown in FIG. 4B, data field 406B includes a two-byte SSID password followed by a two-byte random number that is further followed by a two-byte SSID. In accordance with a corresponding link layer data structure, data in data field 406B are arranged based on a specific order, and each of the data has a fixed length. When the respective data is less than the fixed length, the data are filled with "0" at their ends. However, in some embodiments, the data in data field 406B do not have a fixed length, but are ended with a specific sequence of data, e.g., four bits of "0000." In a specific example, the receiver device used the first data ended with "0000" in data field 406B as a SSID password, the second data ended with "0000" in data field 406B as a random number, and the third data ended with "0000" in data field 406B as a SSID.

Further, as shown in FIG. 4B, second data sequence field 408 also includes a data sequence that has a length of 8 bytes, including two bytes of sequence header field 408A and six bytes of data field 408B. Like first data sequence field 406, each byte in data sequence field 408 starts with a control bit of "1," and the highest two bits of sequence header fields 408A and data field 408B are two control bits of "11" and "10," respectively. Further, the two bytes of sequence header field 408A also include a sequence integrity word and a sequence index, respectively.

In some embodiments, the six bytes of data field 408B identifies an instruction that the receiver device may receive and operate thereupon. In one example, the instruction is defined according to an instruction identification number, and when the receiver device receives the instruction identification number, it identifies the corresponding instruction based on a predetermined instruction lookup table. In addition to the instruction identification number, data field 408B optionally includes instruction information that provides parameters for performing operations according to the corresponding instruction. For instance, as shown in FIG. 2, the instruction information includes the target temperature. As shown in FIG. 4B, the instruction identification number or the instruction information is represented by three bytes of data field 408B.

In some embodiments, the interested data assigned to a data sequence field have a length is less that the length as defined in data control header 402. The extra bytes of the data sequence field are filled with zero.

More details on second data format 40 and corresponding assigned data 42 are explained below with reference to FIGS. 11-15.

Figure 5:
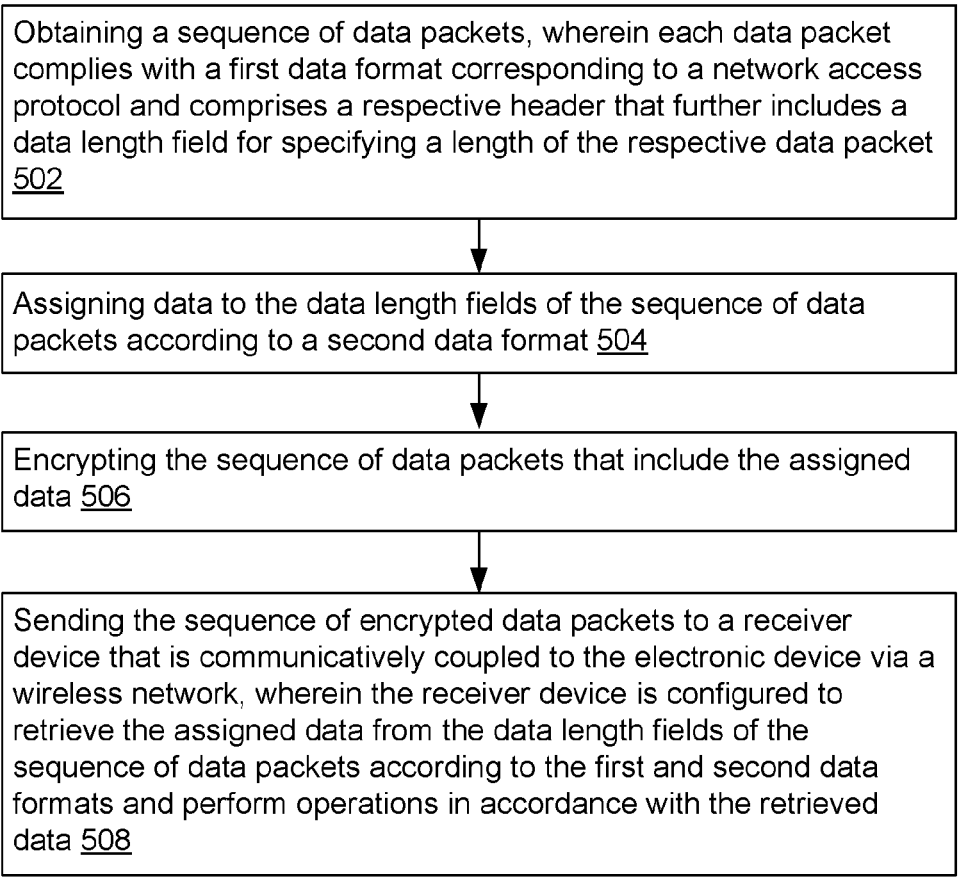
FIG. 5 illustrates a flow chart of an exemplary data communication method that transfers data to a receiver device in accordance with some embodiments.

FIG. 5 illustrates a flow chart of an exemplary data communication method that transfers data to a receiver device in accordance with some embodiments. Method 50 is, optionally, governed by instructions that are stored in a non-transitory computer readable storage medium and that are executed by one or more processors of an electronic device (e.g., device 100). Each of the operations shown in FIG. 5 may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 50 may be combined and/or the order of some operations may be changed.

Method 50 is performed by an electronic device that obtains (502) that obtains a sequence of data packets. Each data packet complies with a first data format corresponding to a network access protocol and includes a respective header that further includes a data length field for specifying a length of the respective data packet. Data are assigned (504) to the data length fields of the sequence of data packets according to a second data format. The sequence of data packets that include the assigned data are then encrypted (506). Further, the sequence of encrypted data packets are sent (508) to a receiver device that is communicatively coupled to the electronic device via a wireless network. The receiver device is configured to retrieve the assigned data from the data length fields of the sequence of data packets according to the first and second data formats and perform operations in accordance with the retrieved data.

In some embodiments, the assigned data includes a SSID and a SSID password, and the SSID identifies the wireless network that transmits the sequence of data packets and is accessible when the SSID password is verified. In some embodiments, the assigned data further includes a random number that is provided by the electronic device to the receiver device with the SSID and the SSID password, such that after receiving the SSID and the SSID password, the receiver device returns the random number to the electronic device to verify that it has received the SSID and the SSID password.

In some embodiments, the network access protocol associated with the sequence of data packets is selected from an IEEE protocol group consisting of Ethernet 802.2 SNAP, Ethernet 802.2, Ethernet 802.3 SNAP, and Ethernet 802.3.

In some embodiments, each data length field includes eight bits of data.

In some embodiments, the sequence of encrypted data packets are sent to the receiver device via a wireless access point that is also communicatively coupled on the identified wireless network.

In some embodiments, as shown in FIGS. 2A and 2B, the electronic device obtains the sequence of data by generating a user interface that includes a plurality of user input spaces for receiving inputs from a user of the electronic device; in accordance with a user input, displaying the sequence of data packets associated with the user input on the plurality of user input spaces; and obtaining the sequence of data packets that are displayed in the corresponding user input spaces.

In some embodiments, in accordance with the second data format, the assigned data includes a data control header that precedes a data field (e.g., data sequence fields 406 and 408) for specifying a plurality of characteristics associated with the assigned data, the data control header and the data field being assigned to the data length fields of a respective subset of data packets. In some situations, in accordance with the second data format, the assigned data include a plurality of bytes, and each byte further includes one or more control bits that identify whether the respective byte is associated with the data control header or the data field of the assigned data. In some situations, in accordance with the second data format, the plurality of characteristics that are associated with the assigned data include validity of the assigned data, and one or more bytes of the data control header are associated with integrity data for the assigned data. In some situations, in accordance with the second data format, the plurality of characteristics that are associated with the assigned data include a data length of the assigned data, and one or more bytes of the data control header are used to define the data length of the assigned data. In some situations, in accordance with the second data format, the data control header further includes one or more bytes that identify a start of the assigned data.

FIG. 6 illustrates a flow chart of another exemplary data processing method that processes data received at a receiver device in accordance with some embodiments. Method 60 is, optionally, governed by instructions that are stored in a non-transitory computer readable storage medium and that are executed by one or more processors of an electronic device (e.g., device 100 or 200). Each of the operations shown in FIG. 6 may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 60 may be combined and/or the order of some operations may be changed.

Method 60 is performed by an electronic device that obtains (602) sequence of data packets from a receiver device that is communicatively coupled to another electronic device via a wireless network. Each decrypted data packet complies with a first data format corresponding to a network access protocol and includes a respective header that further includes a data length field for specifying a length of the respective decrypted data packet. The sequence of data packets are decrypted (604) at the receiver device. Data are then retrieved (606) from the data length fields of the sequence of decrypted data packets according to a second data format distinct from the first data format. The receiver device performs (608) operations in accordance with the retrieved data.

In some embodiments, the retrieved data includes a SSID and a SSID password, and the SSID identifies the wireless network that transmits the sequence of data packets and is accessible when the SSID password is verified.

In some embodiments, the retrieved data further includes a random number that is provided by the electronic device to the receiver device with the SSID and the SSID password, such that after receiving the SSID and the SSID password, the receiver device returns the random number to the electronic device to verify that it has received the SSID and the SSID password.

In some embodiments, the network access protocol associated with the sequence of data packets is selected from an IEEE protocol group consisting of Ethernet 802.2 SNAP, Ethernet 802.2, Ethernet 802.3 SNAP, and Ethernet 802.3.

In some embodiments, each data length field includes eight bits of data.

In some embodiments, in accordance with the second data format, the retrieved data includes a data control header that precedes a data field for specifying a plurality of characteristics associated with the retrieved data, the data control header and the data field being assigned to the data length fields of a respective subset of data packets. Further, in some embodiments, in accordance with the second data format, the retrieved data include a plurality of bytes, and each byte further includes one or more control bits that identify whether the respective byte is associated with the data control header or the data field of the assigned data.

It should be understood that the particular order in which the operations in FIGS. 5 and 6 have been described are merely exemplary and are not intended to indicate that the described order is the only order in which the operations could be performed. One of ordinary skill in the art would recognize various ways to cache and distribute specific data as described herein. Additionally, it should be noted that details of other processes described herein with respect to method 50 or 60 are also applicable in an analogous manner to each other described above with respect to FIGS. 5 and 6. For brevity, these details are not repeated here.

Figure 7:
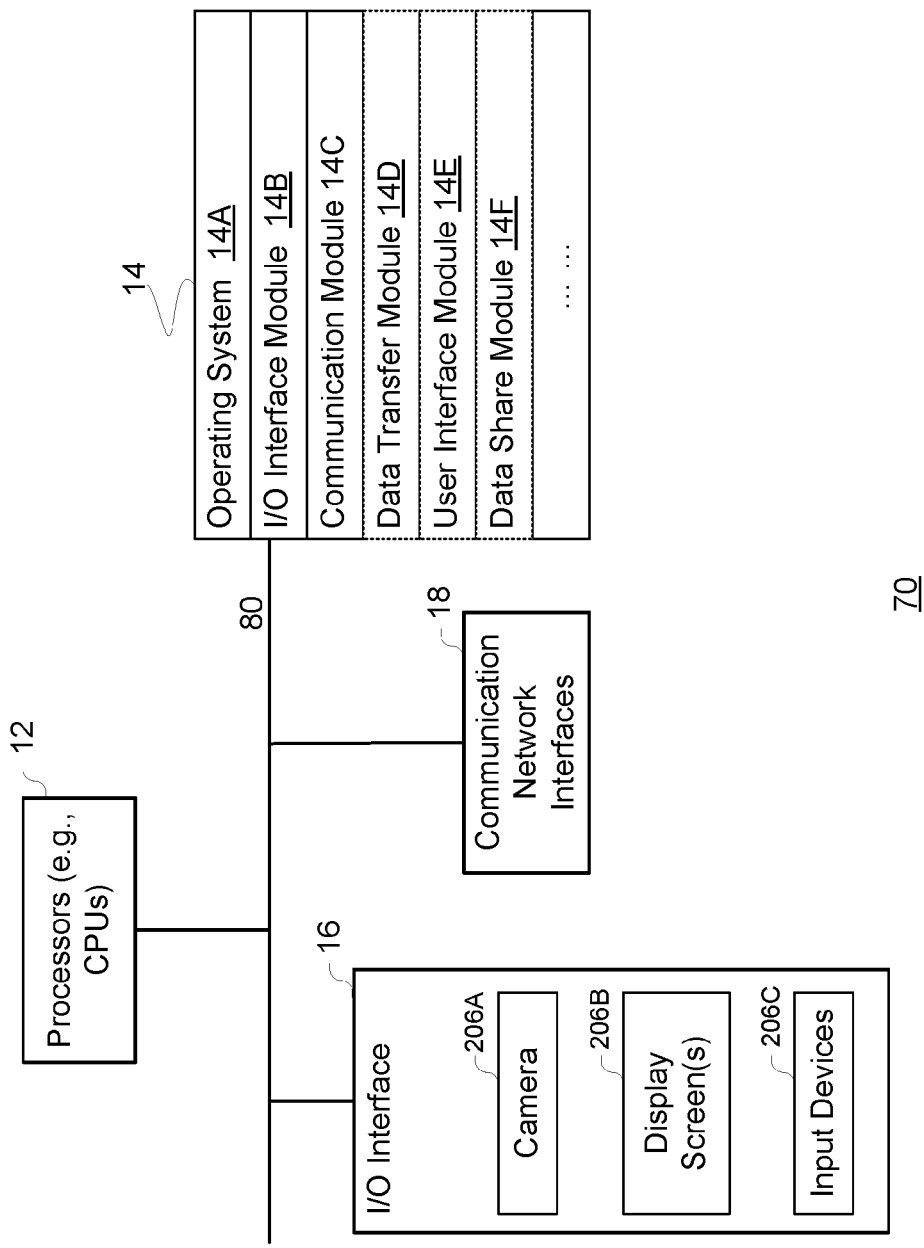
FIG. 7 illustrates a block diagram of an exemplary electronic device' that communicates data in accordance with some embodiments.

FIG. 7 illustrates a block diagram of an exemplary electronic device 70 that communicates data in accordance with some embodiments. In some implementations, electronic device 100 includes one or more processors 12, memory 14 for storing programs and instructions for execution by one or more processors 12, one or more communications interfaces such as input/output interface 16 and network interface 18, and one or more communications buses 80 for interconnecting these components.

In some embodiments, input/output interface 16 includes a display and input devices such as a keyboard, a mouse or a track-pad. In some embodiments, communication buses 80 include circuitry (sometimes called a chipset) that interconnects and controls communications between system components. In some embodiments, memory 14 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 14 includes one or more storage devices remotely located from the one or more processors 12. In some embodiments, memory 14, or alternatively the non-volatile memory device(s) within memory 14, includes a non-transitory computer readable storage medium.

In some embodiments, memory 14 or alternatively the non-transitory computer readable storage medium of memory 14 stores the following programs, modules and data structures, instructions, or a subset thereof:

- Operating system 14A that includes procedures for handling various basic system services and for performing hardware dependent tasks;
- I/O module 14B that includes procedures for handling various basic input and output functions through one or more input and output devices; and
- Communication module 14C that is used for connecting electronic device 100 to other machines (e.g., other electronic devices in network 30) or servers (e.g., server 400) via one or more network communication interfaces 18 (wired or wireless) and one or more communication networks, such as the Internet, other wide area networks, local area networks, metropolitan area networks, and so on.

In some embodiments, electronic device 70 is associated with a master electronic device that provides the SSID data set to a receiver device, and its memory 14 further includes:

- Data transfer module 14D that responds to a data share request by assigning interested data to header fields of one or more data packets, configuring the interested data according to a specific data format and sending the configured data packets to a receiver data; and
- User interface module 14E that generates a user interface (e.g., interface 20) to receive user inputs of the SSID, the SSID password and/or the receiver identifier. In some implementations, user interface module 14E also generates a user interface (e.g., interfere 26) to display data received from the receiver device and receiver user inputs for controlling the receiver device.

In some embodiments, electronic device 70 is associated with a receiver device, and its memory 14 further includes:

- Data share module 14F that obtains the interested data in the header fields of one or more data packets, extracts the interested data, and determines whether the interested data are properly transferred from the master electronic device.

In some embodiments, the sequence of data packets communicated from the master device to the receiver device are encrypted. The receiver device decrypts the encrypted data packets before it extracts the interested data from the header fields of the data packets.

In order to understand the present application clearly, detailed description of the communication method, communication system and information sending/receiving apparatus will be made with reference to the related drawings. The drawings show the preferred embodiments of the communication method, communication system and information sending/receiving apparatus. However, the communication method, communication system and information sending/receiving apparatus may be implemented in many different forms, and not limited to the described embodiments herein. The object of these embodiments is for full and deep disclosure of the communication method, communication system and information sending/receiving apparatus.

Unless there is special definition, all the present application technique and science terms used herein have the same meanings as those understood by the skilled of the technique field of the present application. The terms used herein for the description of the communication method, communication system and information sending/receiving apparatus are merely for describing particular embodiments, which are not intended to limit the present application. The term "and/or" used herein means any combination of one or more listed items.

Figure 8:
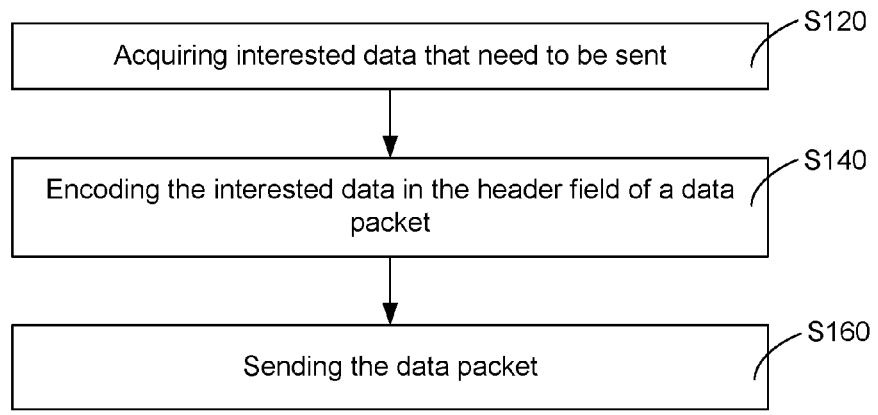
FIG. 8 is a flow chart of a data communication method in accordance with some embodiments.

FIG. 8 is a flow chart of a data communication method 80 in accordance with some embodiments. In some implementations, method 80 is applied to enable wireless communication between a master device and a receiver device. The receiver device operates in a hybrid mode to monitor wireless signals in the space, and method 80 is applied to transfer information from the master device to the receiver device via the wireless signals. In some embodiments, method 80 is particularly useful because the receiver device does not have any other substantial connection with other devices.

At step S120, the master device acquires interested data that need to be sent to the receiver device. The interested data include the user data that need to be sent to the receiver device via a wireless communication network (e.g., network 30), and does not include control data generated by the system for the corresponding transmission process. The interested data, for example, may include a service set identifier (SSID) and a SSID password required for a wireless access, and instructions for controlling an intelligent air-conditioner. The interested data are optionally acquired by receiving user input on the master device. The interested data are optionally provided by another source via a network, or retrieved from a local memory of the master device.

At step S140, the interested data are encoded and assigned in the header field of a data packet. The header field is a plain data field in the data packet. The plain data field is able to be directly monitored, and thus, data of the header field are exposed during a wireless transmission process. When a receiver device is located within a coverage range of a corresponding wireless network, the receiver device can obtain the specific concrete content of the header field, even though the receiver device does not have the SSID and the SSID password associated with the wireless network. In many wireless communication modes, some information in a data packet is not secure, and can be used to as the header field at step S140. For example, at least a data length field in a header of a data packet that adopts an IEEE 802.2 SNAP format is such an header field that allows an easy access to the content stored therein.

The interested data may be transmitted in plaintext or transmitted with additional encryption, wherein the password for the encryption channel is different to the password for encrypting the interested data. If the interested data is encrypted, the receiver device may perform corresponding decryption, wherein the content of the interested data may be directly obtained without influence from the encryption channel.

At step S160, the data packet is sent by the master device to the receiver device. In some embodiments, after it is generated, the data packet is sent using a specific frequency band and a specific power level as specified by a communication protocol. In some embodiments, the data packet is encrypted using a data encryption method, when it is transferred via the corresponding communication channel according to the communication protocol.

In foregoing communication method, by using the header field in a data packet in which the content can be directly monitored, the interested data is encoded and sent out, and is received by the receiver device. With foregoing method, since the content of the header field encoded with the interested data may be directly monitored, the interested data may be obtained even though the contents of other fields in the data packet are encrypted and thus cannot be known, thereby realizing object to send information to a receiver device and receive and obtain the information by the receiver device. The receiver device may receive the interested data, without need of arrangement in advance to establish a connection with environment.

In some embodiments, a Wi-Fi wireless signal may be used a signal carrier to transfer data between the master and receiver devices. In one example, Wi-Fi channels 1 to 14 are used to transfer the data. By using the header field in a data packet in which the content can be directly monitored, the interested data is encoded to the header field, e.g., a data length field of a data packet header. The receiver device may be in hybrid mode to monitor the wireless signal in the space, thereby enabling monitoring the header field in which the content can be directly monitored, and obtaining the interested data by decoding the header field. The method of the embodiment is preferably suitable for transmission of minor data, which may applied in wireless terminals such as mobile phones and tablet computers having capability of wireless sending to send service set identifiers and passwords to intelligent control chips of Internet of Things on intelligent devices. At step S160, the data packet may be a broadcast packet, which is forwarded to receiver devices through a wireless access point. The wireless access point has a large communication power, such that the coverage area of the wireless signal that carries the data packet may be expanded after the wireless signal is forwarded by the wireless access point.

In some embodiments, the header field is a field which is controlled by a regular software application. Conventional operating systems (e.g., iOS or Android) of a mobile terminal has a limited level of control on a data packet, and specifically, may only be able to control all fields in a header of a data packet. In some situations, specific fields (e.g., DA and SA) in a data packet header involves a high level of control, and when such a header field is configured for use as the header field, this high level of control is required. However, many regular software applications operated on the conventional operating systems are not granted with such a high level of control. Therefore, in some implementations, the header field is preferably selected from a specific header field that does not require a high level of control and is controllable by a regular software application. As such, it is convenient to implement and use data communication method 80, and a high level of security is maintained for the corresponding electronic devices.

Figure 9:
FIG. 9 is a schematic diagram of the data packet having an 802.2 SNAP data format in accordance with some embodiments.

FIG. 9 is a schematic diagram of the data packet having an 802.2 SNAP data format in accordance with some embodiments. In some embodiments, when the data packet has a data format that complies with the IEEE 802.2 SNAP, the header field is the data length field in the header of the data packet. In some embodiments, according to a wireless LAN protocol 802.11 set forth by the IEEE, a corresponding IP packet associated with the 802.11 protocol is carried by the logic link control packaging of 802.2. Therefore, the wireless network data transferred under the 802.11 protocol also has the 802.2 SNAP format as shown in FIG. 9. As shown in FIG. 9, when a hybrid mode of Wi-Fi chip is enabled, the receiver device obtains the data packet by monitoring the wireless signal in space and intercepting the data packet from the data link layer according to an 802.2 SNAP format.

The header field "Length" in FIG. 9 represents the length of following data, which is above-mentioned length field. The field DA represents target MAC address, the field SA represents source MAC address, the field LLC represents LLC head (Logical Link Control), and the field SNAP includes a vendor code of 3 bytes and a protocol type identification of 2 bytes. DATA area (data area) is the load, which is ciphertext with respect to a encryption channel, and a receiver device cannot know the specific content of the data area before obtaining the password of the encryption channel. The field FCS represents frame checking sequence. With respect to the monitor of the wireless signal namely the receiver device, the fields DA, SA, Length, LLC, SNAP, FCS are always exposed regardless the encryption of the wireless channel, which may be directly monitored. However, with respect to the master device which carry out the method of the embodiment, the control on the five fields DA, SA, LLC, SNAP, FCS needs a control authority of very high level because of the limitation of the operating system (e.g., iOS or Android), the application for coding in the master device generally is hard to get it.

Therefore, by using the header field "Length" in which the content can be directly monitored and controlled by many software applications, an application for coding in the master device gains convenient control to send data in the header field "Length" of the data packet as needed.

In some embodiments, the data packet is based on a user datagram protocol (UDP). The master devices uses the UDP broadcast packet to carry interested data and specifically, sends a series of UDP broadcast packets in which the respective header field "length" of each packet is encoded with the interested data. The receiver device monitors the wireless signal in space in a hybrid mode, intercepts the data packets that are configured in a 802.2 SNAP format, obtains data in the encoded header fields "Length" of the intercepted data packets, and retrieves the interested data (i.e., the interested data) by decoding the obtained data in the encoded header fields. In some embodiments, the data packet has a data format that complies with a transmission control protocol (TCP).

In some embodiments, due to a limitation for maximum transmission units (MTU), the maximum number of bits that can be used to carry the interested data in the header field "Length" is 10. However, the packet loss rate is normally proportional to the length of the UDP packet. When the header field "Length" provides more than 9 bits for carrying the interested data or the corresponding UDP packet has more than 256 bits, the packet loss rate of the UDP broadcast packet substantially increases, and a loss of order among different packets often occurs. Therefore, in some preferred embodiments, the number of bits is limited to 8 for some header fields that are used for carrying interested data, and the UDP broadcast packet is controlled to have a length of no more than 256 bits. In these circumstances, each UDP data packet includes one byte of interested data that is conveniently readable by the receiver device. Given such limited data amount in each data packet, the interested data may need multiple UDP data packets to be completely transferred from the master device to the receiver device.

Figure 10:
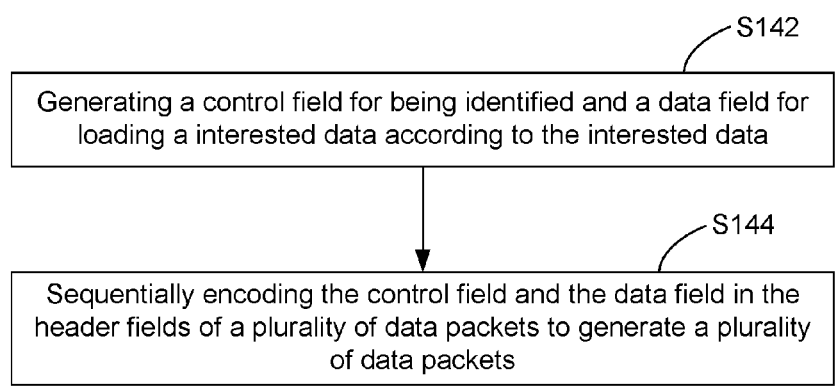
FIG. 10 is a flow chart of an operation (S140) of encoding interested data in a header field (e.g., header field "Length") of a data packet as shown in FIG. 8 in accordance with some embodiments.

FIG. 10 is a flow chart of an operation (S140) of encoding the interested data in the header field (e.g., the header field "Length") of a data packet as shown in FIG. 8 in accordance with some embodiments. Because each data packet can carry limited amount of interested data (e.g., only one byte in some embodiments), the entire interested data are sent through a data packet set including a sequence of data packets. Therefore, as shown in FIG. 10, step S140 further includes:

S142, generating a control field that identifies the header field used for carrying interested data and a data field for loading the interested data according to the interested data.

S144, sequentially encoding the control field and the data field that are associated with the interested data in the header fields of a plurality of data packets. By these means, even when a single data packet has limited interested data amount, interested data having a length larger than that associated with a single data packet may be carried by a data packet set including specific header fields that are defined according to the control field and the data field.

Figure 11:
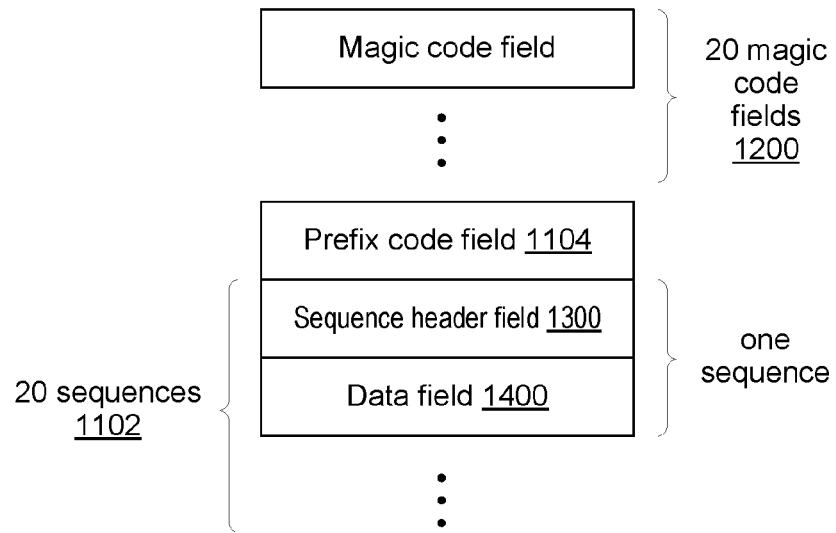
FIG. 11 is a schematic diagram of a link layer data structure that is used to arrange header fields (e.g., header field "Length") in data packet headers for loading interested data in accordance with some embodiments.

FIG. 11 is a schematic diagram of a link layer data structure that is used to arrange header fields (e.g., header field "Length") in data packet headers for loading interested data in accordance with some embodiments. The link layer data structure is divided into two classes: a control field (i.e., field for controlling specifications) and a data field (i.e., field for carrying data). In some embodiments, the control field includes a magic code field (i.e., recognition field) 1200, a prefix code field (i.e., prefix field) 1104, and a sequence header field (i.e., sequence header field) 1300. In the control fields, the identification field 1200 is used for identifying the upcoming interested data, and the prefix field 1104 has a similar function as the identification field except that it precedes a sequence header field 1300 and represents a formal start of a plurality of data sequence.

The data field 1400 includes the sequence header field which is used for loading a check code of the check data. The data field 1400 further includes the sequence field used for loading the interested data. When each header field of a data packet used for carrying the interested data includes a byte (or 8 bits), the control field and the data field are distinguished by the 7th bit of a byte (sometimes called a control bit). Specifically, in one example, the 7th bit of "1" represents data field, and "0" represents control field. In other embodiments, any other bit may be used for the control bit for identifying the control field and the data field, wherein the codes of the control bit in the byte of the control field and the data field are distinct. The bit may be any one of 0th bit to 7th bit. In some embodiments, 0 may represents the data fields, and 1 represents the control fields. The magic code field and sequence header field are distinguished by the 6th bit, and 1 represents the sequence header field while 0 represents the identification field. In other embodiments, other bit(s) may also be used for identifying the magic code field. In some embodiments, 0 may represents the sequence header field, and 1 represents the identification field.

Figure 12:
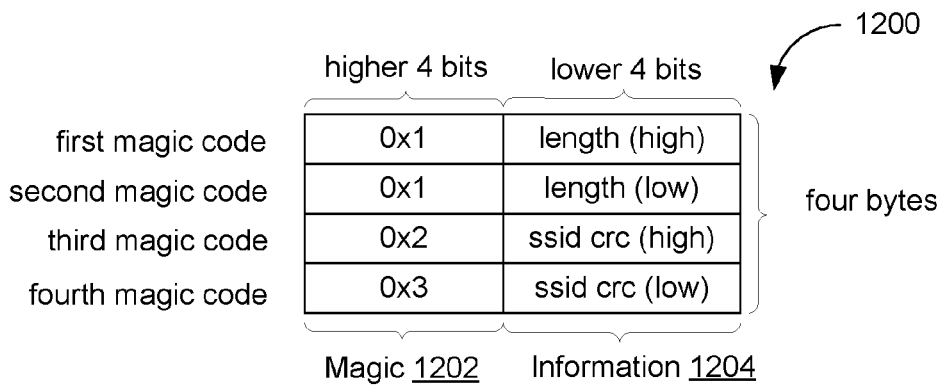
Figure 13:
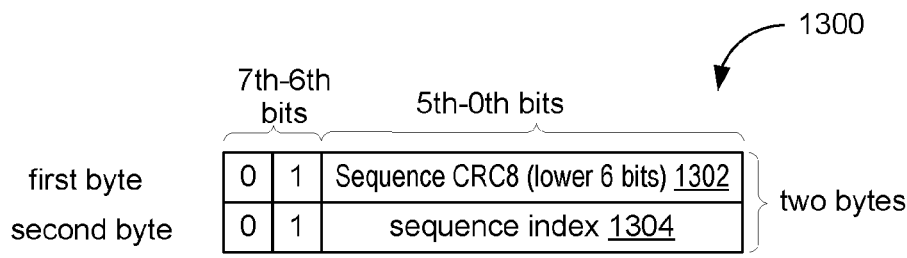

FIGS. 12, 13 and 14 are schematic diagrams of a magic code field 1200, a sequence header 1300 and a data field 1400 that are configured based on the link layer data structure in accordance with some embodiments, respectively. Referring to FIG. 12, an identification field 1200 includes magic codes (i.e., identification byte), each magic code or identification byte includes magic (i.e., identification code) 1202 for identifying the magic code and information (i.e., information code) 1204 for loading information. In some embodiments, the identification field 1200 includes 4 bytes, wherein the higher 4 bits of each byte include the identification code 1202 and the lower 4 bits include the information code 1204. In one specific example, the first two bytes of the information code 1202 carry the higher 4 bits and lower 4 bits of the length of the data to be sent, respectively, and the last two bytes of the information code 1202 respectively carry the higher 4 bits and the lower 4 bit of the CRC8 (circular redundancy check code) value of the data to be sent. When data communication method 80 is used to transfer a SSID and a SSID password of a Wi-Fi network, the CRC8 code of the SSID in the identification field 1200 improves the entire transmission procedure. In some implementations, before the receiver device receives data, the wireless access points (APs) is scanned to obtain the SSID, RSSI (received signal strength indicator) and channels of all non-hide APs in the wireless environment. During the subsequent data communication process, the receiver device first acquires the CRC8 value associated with the SSID of a target AP, and then compares it with the CRC8 value of the SSID obtained from a previous scan. If these two CRC values match, the receiver device will not need to receive the SSID information again and thereby shorten the transmission time.

In some embodiments, a predetermined number of bytes (e.g., 20) are sent for identification fields 1200. The wireless network environment in which the receiver device locates may be complicated. Specifically, there would be multiple APs in the same space, and these APs may be distributed on same or different channels. Therefore, initially, the receiver device does not recognize which channel of 1 to 14 is used by the master device to send information and which of numerous devices on a specific channel is associated with the master device. In this situation, the receiver device could receive huge amount of data provided by different devices from different channels.

In order to find out the channel used by the master device and the physical address (i.e., MAC address) of the master device from the huge amount of data, the master device may send a predetermined number of bytes as identification fields 1200 before sending other information. Each of these identification fields 1200 includes 4 bytes, and is used to identify the master device. Therefore, the receiver device can know and focus on the MAC address and the channel of the master device, and use them in subsequent information monitoring procedure to effectively filter the huge amount of data.

Referring to FIG. 13, in some embodiments, the sequence header field 1300 includes sequence CRC8 (i.e., sequence circular redundancy check code) 1302 and sequence index (i.e., sequence index) 1304. Each data sequence field 1102 also includes a number of bytes in a respective data field used for loading the interested data. A sequence header field 1300 and a sequence data field 1400 forms a data sequence field 1102, and the interested data may be carried by a plurality of data sequence fields 1102. In some embodiments, the interested data to be sent are divided with the grain size of 4 bytes (padding with 0 will be needed if the length of the interested data cannot be exactly divided), each 4 sequence bytes are loaded to a data sequence field 1102, and the data is sent in unit of data sequences. Furthermore, in some embodiments, the interested data is sent for predetermined times in order to correct errors. After the interested data is sent at the first time, i.e., after the N sequences including said interested data are sent at the first time, and before start to send N sequences again, a prefix field 1104 is sent for one time to represent the start of N sequences. That is to say, when sending repeatedly, the data packet includes prefix field 1104, sequence header field 1300 and data field 1400, wherein the identification field 1200 is optional. In some embodiments, the sequence header field 1300 includes two bytes, wherein the lower six bits of the first byte carry the CRC8 of all sent data from the start of the sequence index 1304 to the end of the sequence. After receiving a sequence of data, check for the CRC8 value is performed. If the CRC value is not consistent with a previously scanned CRC value, the sequence of data is received with errors and thereby discarded.

Referring to FIG. 14, in some embodiments, the sequence data field 1400 includes 4 bytes, the 7th bit of each byte is the control bit and is fixed as 1, and the rest 7 bits are used for loading interested data. In some embodiments, the interested data include one of more of the SSID, the SSID password, and a random number used for confirming the reception of the interested data. In some implementations, after an AP is connected, the master device immediately sends a UDP broadcast packet containing a random number. The receiver device is supposed to return the random number to the master device, and it can be determined that the receiver device has received the interested data correctly, when the master device has received the random number without any error. The size of the random number is one byte, and thus, its value is smaller than 127. In some embodiments, the SSID and the SSID password are ended with '\0' and encrypted based on a lookup table or a dictionary, and the corresponding receiver device may use the same lookup table or dictionary to decrypt the received SSID and SSID password.

FIG. 15 is a schematic diagram of a data field including a SSID, a SSID password and a random number in accordance with some embodiments. According to a sending order, the master device sequentially sends the SSID password, the random number and the SSID. In some embodiments, the receiver device acquires the CRC8 value of the SSID of a target AP in the identification field 1200, and compares it with the CRC8 value of the SSID that was previously obtained. When theses two CRC8 values are consistent, the SSID information is verified, and the receiver device does not need to process the subsequent SSID information, thereby reducing the transmission time and improving the corresponding transmission efficiency.

FIG. 16 is a flow chart of another exemplary data communication method 1600 in accordance with some embodiments. Data communication method 1600 may be implemented at receiver devices that operate in a hybrid mode to monitor wireless signals in space to perform wireless communication with master devices, such as a mobile phone, a tablet computer, that are capable of sending wireless signals. In some embodiments, data communication method 1600 is implemented to receive information when a receiver device is communicatively coupled to other devices only via one communication network.

As shown in FIG. 16, data communication method 1600 includes following steps:

S220, receiving data packets generated by encoding the interested data in the header field. The header field is a field in the data packet which may directly monitored. Step S220 is associated with step S160. For the data packet transmitted on the encryption channel, the data packet is acquired on the encryption channel.

S240, decoding the header field to obtain the interested data. The interested data may be obtained through decoding according to the format corresponding to the encoding. For the data packet transmitted through an encryption channel, although the data field of the data packet is encrypted and thus the specific content contained in the data field cannot be recognized, the header field that carries the interested data can be directly monitored without knowing the corresponding encryption method that encrypts the data field of the data packet. The interested data are retrieved from the open header field.

Data communication method 1600 may involve a Wi-Fi network based on a Wi-Fi wireless communication protocol, and is suitable for communicating small amount of data. In some embodiments, data communication method 1600 is applied to control an intelligent control chip of Internet of Things to receive a SSID and a corresponding SSID password. For example, in a receiving mode, an intelligent switch does not have a key or touch screen to receive inputs of a SSID, and thereby, obtains the SSID and the password conveniently and quickly using data communication method 1600. Above-mentioned data packet may be a broadcast packet, and may be received through forwarding by a wireless access point. The wireless access point has large power, so that the coverage area of signal physical space of wireless communication may be increased when it forwards the corresponding wireless signals. The receiver device carries out step S220, by monitoring the wireless signals in space in a hybrid mode. At step S220, the receiver device retrieves data from a data packet in a data link layer.

As for the data packet and the header field, please referring to the embodiments shown in FIG. 8 to FIG. 15. The data packet is packaged and encrypted by a master device in an IP layer and a data link layer. Therefore, the step S240 includes a step for modifying the header field "Length." In some embodiments, the data packet is sent as a UDP broadcast packet on a UDP layer, and the data packet of the UDP layer is packaged in an IP layer and a data link layer, but encrypted based on WPA2, WPA or WEP by the master device. Due to the need of packaging and encryption, extra bytes are added to each data packet. Thus, the length of the UDP broadcast packet sent by the master device will be different with the value of the header field "Length" monitored finally by the receiver device, therefore modification is needed. It is found that: as long as the length of the UDP broadcast packet is within the limitation range of the MTU (i.e., the UDP packet will not be intersected), the difference between the length of the UDP broadcast packet sent by the master device and the value of the header field "Length" monitored finally by the receiver device is a constant value. And the constant value will not change along with the length change of the UDP broadcast packet, and rather, is merely associated with the Wi-Fi encryption method used to encrypt the data packet. Therefore, as long as the value of the difference under different encryption manner is known, the receiver device can track the header field "Length" accurately.

FIG. 17 is a modification table showing differences of data packet lengths of data packets that are sent by a master device and monitored by a receiver device, respectively, in accordance with some embodiments. Through a series of experiments, a modification table is obtained as shown in FIG. 17. AES is the abbreviation of Advanced Encryption Standard, it is an advanced encryption standard. TKIP is the abbreviation of Temporal Key Integrity Protocol, which means temporary key integrity protocol. RC4 is a stream encryption algorithm with variable key length. If Wi-Fi encryption manner is WPA2 (AES), the receiver device intercept a UDP broadcast packet of 802.2 SNAP format in link layer through monitoring, the value of field Length is 152, the receiver device modifies it and obtains the content sent by the master device as 152−52=100. Therefore, the step of modifying the length field is: subtracting preset modification value from the value of the length field.

In some embodiments, one reception of interested data is completed through receiving a data packet set composed by a plurality of data packets, the step S240 include: decoding the plurality of data packets, to sequentially obtain the control field used for being identified and the data field used for loading interested data, which are encoded in the header fields of the plurality of data packets. The control fields include identification field and sequence header field, wherein the identification field is used for identification, and the sequence header field is used for decoding the obtained check code of the check data. The data fields include sequence field, and the sequence field is used for loading the interested data.

The sequence header field includes sequence circular redundancy check code, and sequence index. The sequence field includes sequence byte, and the sequence field is used for obtaining the interested data. After receiving a data packet set, check is performed through sequence circular redundancy check code. If the check fails, the sequence of data is proved to be received with errors, which should be discarded.

In some embodiments, a sequence header field and a sequence field consist a sequence, and the interested data may be transmitted by a plurality of sequences. The sequence header field includes two bytes, wherein the lower six bits of the first byte carry the CRC8 of all sent data from the start of the sequence index to the end of the sequence. After receiving a sequence of data, check for the CRC8 value is performed. If not same, the sequence of data is proved to be received with errors, which should be discarded.

Before receiving N sequences carrying the interested data at each time, the prefix field will be received, the SSID CRC8 of the SSID used for decoding may be obtained. The communication method of the embodiment also includes scanning the APs in the environment to obtain an environment service set identifier. The environment service set identifier is checked with the SSID CRC8, if success, giving up receiving the SSID. Before the receiver device receives data, the wireless access points (APs) is scanned, wherein the SSID, RSSI (received signal strength indicator) and channels of all non-hide APs in the wireless environment may be obtained through acquired beacon During transmission procedure, the receiver device first acquires the CRC8 value of the SSID of a target AP, then compares it with the CRC8 value of the SSID obtained by scanning previously. If same value is found, the receiver device will not need to receive the SSID information again in the following procedure of reception, thereby significantly shortening the transmission time.

The communication model in the foregoing embodiment may be abstracted as a unidirectional channel with its error rate of 0-5%, wherein the maximum length of information to be transferred is 68 bytes. In such a case, if not using error correction algorithm, it is hard to assurance the completion of sending information in limited times. In some embodiments, the accumulation error correction algorithm is used to assurance the completion of transmission in limited times. Theoretical base of the accumulation error correction algorithm is that in multiple processes of sending data the error probability of data on the same bit is very low. Therefore multiple results of transferring data may be accumulated and analyzed. For a bit with large probability of error data in one process, its corresponding correct value may be found in other processes, thereby assuring the completion of sending information in limited times.

Figures 18, 19, 20, 21:
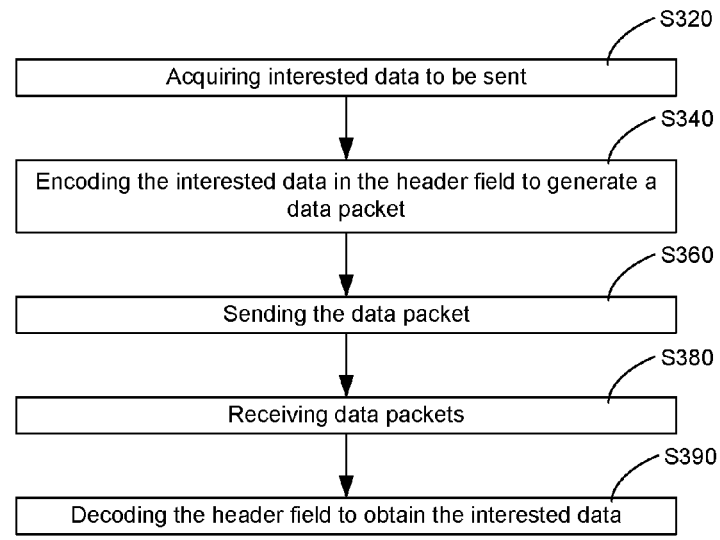
FIG. 18 is an exemplary table showing error probabilities of data communication in accordance with some embodiments.
FIGS. 19 and 20 are schematic diagrams of two data packets having an Ethernet 802.2 data format and an Ethernet 802.3 data format, respectively, in accordance with some embodiments.
FIG. 21 illustrates a flow chart of an exemplary data communication method that transfers data via data packet headers in accordance with some embodiments.

FIG. 18 is an exemplary table showing error probabilities of data communication in accordance with some embodiments. Assuming the length of information to be transferred is 68 bytes, in worst case, the probability of successful sending information is calculated with the accumulation error correction algorithm and without accumulation error correction algorithm, and the relationship between the results and times of sending is shown in FIG. 18. Assuming the error rate in transferring a byte is 5%, if 68 bytes of data is needed to be transferred, then the probability of successful transferring in one process is: $(1-0.05)^{68}=3\%$. In the case that the foregoing error correction algorithm is used, the probability of successful transferring in one process is also 3%, and the probability of successful transferring in n processes is: $(1-0.05'')^{68}$.

The transmission rate of the embodiment depends on the sending rate of the UDP broadcast packet in master device. Currently, the frequency of sending broadcast packets is ⅕ ms, so that the transmission rate is 200 bytes/s. In the case that the identification field will not be calculated, the efficiency of load is 66.7%. If the length of information sent is 68 bytes which is the longest, in the worst case, the information sending may be completed in 5 times at most, and the transmission time at most is 68/66.7*5/200=2.549s.

FIGS. 19 and 20 are schematic diagrams of two data packets having an Ethernet 802.2 data format and an Ethernet 802.3 data format, respectively, in accordance with some embodiments.

In another embodiment, the data packet also may be in Ethernet 802.2 format. FIG. 19 is the schematic diagram of the data packet in Ethernet 802.2 format, wherein, the header field is the length field in the data packet in the format of 802.2 SNAP, the others are the same as those in the data packet according to the embodiment of Ethernet 802.2 SNAP. The field Length in FIG. 19 represents the length of following data, which is above-mentioned length field. The field DA represents target MAC address, the field SA represents source MAC address, the field LLC represents LLC head, data field is load, and the field FCS represents the frame check sequence.

The data packet also may is in Ethernet 802.3 format. FIG. 20 is the schematic diagram of the data packet in Ethernet 802.3 format, wherein, the header field is the length field in the data packet in the format of Ethernet 802.3, the others are the same as those in the data packet according to the embodiment of Ethernet 802.2 SNAP. The field Length in FIG. 20 represents the length of following data, which is above-mentioned length field. The field DA represents target MAC address, the field SA represents source MAC address, data field is load, and the field FCS represents the frame check sequence.

The data packet also may is in Ethernet 802.3 SNAP format. Referring to FIG. 9, the schematic diagram of the data packet in Ethernet 802.3 SNAP format is the same as those in the data packet according to the embodiment of Ethernet 802.2 SNAP format, wherein, the header field is the length field in the data packet in the format of Ethernet 802.3 SNAP.

FIG. 21 is an implementation mode of the communication method. The embodiment may be applied in receiver devices in hybrid mode to monitor wireless signal in space to perform wireless communication with terminals (e.g., mobile phones, tablet computers) that are capable of sending wireless signals. Especially may applied to receive information in the case that the receiver device has no substantial connection with other devices.

As shown in FIG. 21, the communication method of the embodiment includes following steps:

S320, acquiring interested data to be sent. The interested data is the user data which needed to be send to receiver devices for wireless communication, but not the transmission control data automatically generated by the system for transmission process. The interested data, for example, may be a service set identifier (SSID) and a password required at wireless access, and adjustment parameter of an intelligent air-conditioner. The interested data may be acquired by receiving user input, may be acquired through network, or may be acquired from a local memory of the master device.

S340, encoding the interested data in the header field to generate a data packet, wherein, the header field is a field in the data packet which may directly monitored. The header field in which the content can be directly monitored refers to a field for exposing specific content in a wireless transmission procedure. As long as within the coverage of signal, any receiver device having wireless transmission function can obtain the specific concrete content of the header field, even though without the password of the wireless communication. In many wireless communication modes, some information in a data packet are not necessary to be secreted, for example the length field and the like in data packet of 802.2 SNAP format, which are exposed directly.

S360, sending the data packet. Particularly, the data packet is sent, for example, by using given frequency, power and the like according to the requirement of wireless communication after the data packet is generated. If the channel for sending data packet is encrypted, the data packet is sent through the encryption channel.

S380, receiving data packets. This step corresponds with S360. For the data packet transmitted on the encryption channel, the data packet is acquired on the encryption channel.

S390, decoding the header field to obtain the interested data. The interested data may be obtained through decoding according to the format corresponding to the encoding. For the data packet transmitted through a encryption channel, in which although the data area of the data packet is encrypted and thus the specific content cannot be known, the header field is a field of the data packet in which the content can be directly monitored without influence of the encryption channel, so that the content in the header field can be obtained for decoding.

In foregoing communication method, by using the header field in a data packet in which the content can be directly monitored, the interested data is encoded and sent out, and is received by the receiver device. With foregoing method, since the content of the header field encoded with the interested data may be directly monitored, the interested data may be obtained even though the contents of other fields in the data packet are encrypted and thus cannot be known, thereby realizing object to send information to a receiver device and receive and obtain the information by the receiver device. The receiver device may receive the interested data, without need of arrangement in advance to establish a connection with environment.

For the signal carrier, Wi-Fi wireless signal may be adopted for information transfer. Preferred, all channels of 1 to 14 may be used for support. By using the header field in a data packet in which the content can be directly monitored, the interested data is encoded. The receiver device may be in hybrid mode to monitor the wireless signal in the space, thereby enabling monitoring the header field in which the content can be directly monitored, and obtaining the interested data by decoding the header field. The method of the embodiment is preferably suitable for transmission of minor data, which may applied in wireless terminals such as mobile phones and tablet computers having capability of wireless sending to send service set identifiers and passwords to intelligent control chips of Internet of Things on intelligent devices. In step S360, the data packet may be a broadcast packet, which is forwarded to receiver devices through wireless access point. The wireless access point has large power, so that the coverage area of signal physical space of wireless communication may be increased by its forwarding.

In some embodiments, the header field is a field which may directly controlled by normal application. Because of the limitation of operating system (e.g., iOS or Android) of a mobile terminal, a control authority of very high level is needed for the control for a field in which the content can be directly monitored, thus those applications for coding is hard to get those control. If a field that can be directly controlled by normal applications is selected as the header field, a control authority of very high level is not needed to carry out the application of the embodiment, which is not only convenient for use but also keep the security of the system. In some embodiments, the data packet may be in the format of 802.2 SNAP, the header field is the length field in the data packet in the format of 802.2 SNAP. 802.11 is a wireless LAN protocol set by IEEE, with which the IP packet is carried by the logic link control packaging of 802.2, therefore the wireless network data may be received with 802.2 SNAP format. If the hybrid mode of Wi-Fi chip is enabled, the data packet as shown in FIG. 9 may be obtained by monitoring the wireless signal in space and intercepting the data from the data link layer with 802.2 SNAP format.

The header field "Length" in FIG. 9 represents the length of following data, which is above-mentioned length field. The field DA represents target MAC address, the field SA represents source MAC address, the field LLC represents LLC head (Logical Link Control), and the field SNAP includes a vendor code of 3 bytes and a protocol type identification of 2 bytes. DATA area (data area) is the load, which is ciphertext with respect to a encryption channel, and a receiver device cannot know the specific content of the data area before obtaining the password of the encryption channel. The field FCS represents frame checking sequence. With respect to the monitor of the wireless signal namely the receiver device, the fields DA, SA, Length, LLC, SNAP, FCS are always exposed regardless the encryption of the wireless channel, which may be directly monitored. However, with respect to the master device which carry out the method of the embodiment, the control on the five fields DA, SA, LLC, SNAP, FCS needs a control authority of very high level because of the limitation of the operating system (e.g., iOS or Android), the application for coding in the master device generally is hard to get it.

Therefore, by using the header field "Length" in which the content can be directly monitored and controlled by many software applications, an application for coding in the master device gains convenient control to send data in the header field "Length" of the data packet as needed.

In some embodiments, the data packet is based on a user datagram protocol (UDP). The master devices uses the UDP broadcast packet to carry interested data and specifically, sends a series of UDP broadcast packets in which the respective header field "length" of each packet is encoded with the interested data. The receiver device monitors the wireless signal in space in a hybrid mode, intercepts the data packets that are configured in a 802.2 SNAP format, obtains data in the encoded header fields "Length" of the intercepted data packets, and retrieves the interested data (i.e., the interested data) by decoding the obtained data in the encoded header fields. In some embodiments, the data packet has a data format that complies with a transmission control protocol (TCP).

In some embodiments, due to a limitation for maximum transmission units (MTU), the maximum number of bits that can be used to carry the interested data in the header field "Length" is 10. However, the packet loss rate is normally proportional to the length of the UDP packet. When the header field "Length" provides more than 9 bits for carrying the interested data or the corresponding UDP packet has more than 256 bits, the packet loss rate of the UDP broadcast packet substantially increases, and a loss of order among different packets often occurs. Therefore, in some preferred embodiments, the number of bits is limited to 8 for some header fields that are used for carrying interested data, and the UDP broadcast packet is controlled to have a length of no more than 256 bits. In these circumstances, each UDP data packet includes one byte of interested data that is conveniently readable by the receiver device. Given such limited data amount in each data packet, the interested data may need multiple UDP data packets to be completely transferred from the master device to the receiver device.

Since each data packet can carry fewer data, in some embodiments, one whole interested data is sent through a data packet set consisting of a plurality of data packets, thus the step S340 include:

generating a control field for being identified and a data field for loading a interested data according to the interested data; and sequentially encoding the control field and the data field in the header fields of a plurality of data packets to generate a plurality of data packets.

By using the control field and data field, in the case that a single data packet has limited interested data amount, a data transmission with its data amount larger than that of a single data packet may be realized by means of a data packet set.

FIG. 11 is a schematic diagram of a link layer data structure that is used to arrange header fields (e.g., header field "Length") in data packet headers for loading interested data in accordance with some embodiments. The link layer data structure is divided into two classes: a control field (i.e., field for controlling specifications) and a data field (i.e., field for carrying data). In some embodiments, the control field includes a magic code field (i.e., recognition field) 1200, a prefix code field (i.e., prefix field) 1104, and a sequence header field (i.e., sequence header field) 1300. In the control fields, the identification field 1200 is used for identifying the upcoming interested data, and the prefix field 1104 has a similar function as the identification field except that it precedes a sequence header field 1300 and represents a formal start of a plurality of data sequence.

The data field 1400 includes the sequence header field which is used for loading a check code of the check data. The data field 1400 further includes the sequence field used for loading the interested data. When each header field of a data packet used for carrying the interested data includes a byte (or 8 bits), the control field and the data field are distinguished by the 7th bit of a byte (sometimes called a control bit). Specifically, in one example, the 7th bit of "1" represents data field, and "0" represents control field. In other embodiments, any other bit may be used for the control bit for identifying the control field and the data field, wherein the codes of the control bit in the byte of the control field and the data field are distinct. The bit may be any one of 0th bit to 7th bit. In some embodiments, 0 may represents the data fields, and 1 represents the control fields. The magic code field and sequence header field are distinguished by the 6th bit, and 1 represents the sequence header field while 0 represents the identification field. In other embodiments, other bit(s) may also be used for identifying the magic code field. In some embodiments, 0 may represents the sequence header field, and 1 represents the identification field.

Referring to FIG. 12, an identification field 1200 includes magic codes (i.e., identification byte), each magic code or identification byte includes magic (i.e., identification code) 1202 for identifying the magic code and information (i.e., information code) 1204 for loading information. In some embodiments, the identification field 1200 includes 4 bytes, wherein the higher 4 bits of each byte include the identification code 1202 and the lower 4 bits include the information code 1204. In one specific example, the first two bytes of the information code 1202 carry the higher 4 bits and lower 4 bits of the length of the data to be sent, respectively, and the last two bytes of the information code 1202 respectively carry the higher 4 bits and the lower 4 bit of the CRC8 (circular redundancy check code) value of the data to be sent. When data communication method 80 is used to transfer a SSID and a SSID password of a Wi-Fi network, the CRC8 code of the SSID in the identification field 1200 improves the entire transmission procedure. In some implementations, before the receiver device receives data, the wireless access points (APs) is scanned to obtain the SSID, RSSI (received signal strength indicator) and channels of all non-hide APs in the wireless environment. During the subsequent data communication process, the receiver device first acquires the CRC8 value associated with the SSID of a target AP, and then compares it with the CRC8 value of the SSID obtained from a previous scan. If these two CRC values match, the receiver device will not need to receive the SSID information again and thereby shorten the transmission time.

In some embodiments, a predetermined number of bytes (e.g., 20) are sent for identification fields 1200. The wireless network environment in which the receiver device locates may be complicated. Specifically, there would be multiple APs in the same space, and these APs may be distributed on same or different channels. Therefore, initially, the receiver device does not recognize which channel of 1 to 14 is used by the master device to send information and which of numerous devices on a specific channel is associated with the master device. In this situation, the receiver device could receive huge amount of data provided by different devices from different channels.

In order to find out the channel used by the master device and the physical address (i.e., MAC address) of the master device from the huge amount of data, the master device may send a predetermined number of bytes as identification fields 1200 before sending other information. Each of these identification fields 1200 includes 4 bytes, and is used to identify the master device. Therefore, the receiver device can know and focus on the MAC address and the channel of the master device, and use them in subsequent information monitoring procedure to effectively filter the huge amount of data.

Referring to FIG. 13, in some embodiments, the sequence header field 1300 includes sequence CRC8 (i.e., sequence circular redundancy check code) 1302 and sequence index (i.e., sequence index) 1304. Each data sequence field 1102 also includes a number of bytes in a respective data field used for loading the interested data. A sequence header field 1300 and a sequence data field 1400 forms a data sequence field 1102, and the interested data may be carried by a plurality of data sequence fields 1102. In some embodiments, the interested data to be sent are divided with the grain size of 4 bytes (padding with 0 will be needed if the length of the interested data cannot be exactly divided), each 4 sequence bytes are loaded to a data sequence field 1102, and the data is sent in unit of data sequences. Furthermore, in some embodiments, the interested data is sent for predetermined times in order to correct errors. After the interested data is sent at the first time, i.e., after the N sequences including said interested data are sent at the first time, and before start to send N sequences again, a prefix field 1104 is sent for one time to represent the start of N sequences. That is to say, when sending repeatedly, the data packet includes prefix field 1104, sequence header field 1300 and data field 1400, wherein the identification field 1200 is optional. In some embodiments, the sequence header field 1300 includes two bytes, wherein the lower six bits of the first byte carry the CRC8 of all sent data from the start of the sequence index 1304 to the end of the sequence. After receiving a sequence of data, check for the CRC8 value is performed. If the CRC value is not consistent with a previously scanned CRC value, the sequence of data is received with errors and thereby discarded.

Referring to FIG. 14, in some embodiments, the sequence data field 1400 includes 4 bytes, the 7th bit of each byte is the control bit and is fixed as 1, and the rest 7 bits are used for loading interested data. In some embodiments, the interested data include one of more of the SSID, the SSID password, and a random number used for confirming the reception of the interested data. In some implementations, after an AP is connected, the master device immediately sends a UDP broadcast packet containing a random number. The receiver device is supposed to return the random number to the master device, and it can be determined that the receiver device has received the interested data correctly, when the master device has received the random number without any error. The size of the random number is one byte, and thus, its value is smaller than 127. In some embodiments, the SSID and the SSID password are ended with '\0' and encrypted based on a lookup table or a dictionary, and the corresponding receiver device may use the same lookup table or dictionary to decrypt the received SSID and SSID password.

Further as shown in FIG. 15, according to a sending order, the master device sequentially sends the SSID password, the random number and the SSID. In some embodiments, the receiver device acquires the CRC8 value of the SSID of a target AP in the identification field 1200, and compares it with the CRC8 value of the SSID that was previously obtained. When theses two CRC8 values are consistent, the SSID information is verified, and the receiver device does not need to process the subsequent SSID information, thereby reducing the transmission time and improving the corresponding transmission efficiency.

The receiver device of the embodiment may be based on Wi-Fi wireless communication protocol, is suitable for receiving minor data, and may be applied in the intelligent control chip of Internet of Things to receive SSID and password. For example, through this receiving mode, an intelligent switch without a key or touch screen for inputting a SSID may obtain the SSID and password conveniently and quickly. Above-mentioned data packet may be a broadcast packet, and may be received through forwarding by a wireless access point. The wireless access point has large power, so that the coverage area of signal physical space of wireless communication may be increased by its forwarding. The receiver device carries out step S380, by monitoring the wireless signal in space with a hybrid mode. Step S380 is intercepting data in data link layer and obtaining data packet.

Before sending, the data packet is packaged and encrypted in IP layer and data link layer. Therefore, the step S390 includes a step for modifying the length field. In some embodiments, the data packet is sent as UDP broadcast packet. A data packet of UDP layer is first packaged in IP layer and data link layer, encrypted (in manners of WPA2, WPA or WEP) and then is sent out. In this way, the length of UDP broadcast packet sent by the master device will be different with the value of the header field "Length" monitored finally by the receiver device, therefore modification is needed. It is found that: as long as the length of the UDP broadcast packet is within the limitation range of the MTU (i.e., the UDP packet will not be intersected), the difference between the length of the UDP broadcast packet sent by the master device and the value of field Length monitored finally by the receiver device is a constant value. And the constant value will not change along with the length change of the UDP broadcast packet, and is only associated with the Wi-Fi encryption manner for the channel. Therefore, as long as the value of the difference under different encryption manner is found out, the receiver device can modify the header field "Length".

Through a series of experiments, a modification table is obtained as shown in FIG. 17. AES is the abbreviation of Advanced Encryption Standard, it is an advanced encryption standard. TKIP is the abbreviation of Temporal Key Integrity Protocol, which means temporary key integrity protocol. RC4 is a stream encryption algorithm with variable key length. If Wi-Fi encryption manner is WPA2 (AES), the receiver device intercept a UDP broadcast packet of 802.2 SNAP format in link layer through monitoring, the value of field Length is 152, the receiver device modifies it and obtains the content sent by the master device as 152−52=100. Therefore, the step of modifying the length field is: subtracting preset modification value from the value of the length field.

In some embodiments, one reception of interested data is completed through receiving a data packet set composed by a plurality of data packets, the step S390 include: decoding the plurality of data packets, to sequentially obtain the control field used for being identified and the data field used for loading interested data, which are encoded in the header fields of the plurality of data packets. The control fields include identification field and sequence header field, wherein the identification field is used for identification, and the sequence header field is used for decoding the obtained check code of the check data. The data fields include sequence field, and the sequence field is used for loading the interested data.

The sequence header field includes sequence circular redundancy check code, and sequence index. The sequence field includes sequence byte, and the sequence field is used for obtaining the interested data. After receiving a data packet set, check is performed through sequence circular redundancy check code. If the check fails, the sequence of data is proved to be received with errors, which should be discarded.

In some embodiments, a sequence header field and a sequence field consist a sequence, and the interested data may be transmitted by a plurality of sequences. The sequence header field includes two bytes, wherein the lower six bits of the first byte carry the CRC8 of all sent data from the start of the sequence index to the end of the sequence. After receiving a sequence of data, check for the CRC8 value is performed. If not same, the sequence of data is proved to be received with errors, which should be discarded.

Before receiving N sequences carrying the interested data at each time, the prefix field will be received, the SSID CRC8 of the SSID used for decoding may be obtained. The communication method of the embodiment also includes scanning the APs in the environment to obtain an environment service set identifier. The environment service set identifier is checked with the SSID CRC8, if success, giving up receiving the SSID. Before the receiver device receives data, the wireless access points (APs) is scanned, wherein the SSID, RSSI (received signal strength indicator) and channels of all non-hide APs in the wireless environment may be obtained through acquired beacon. During transmission procedure, the receiver device first acquires the CRC8 value of the SSID of a target AP, then compares it with the CRC8 value of the SSID obtained by scanning previously. If same value is found, the receiver device will not need to receive the SSID information again in the following procedure of reception, thereby significantly shortening the transmission time.

The communication model in the foregoing embodiment may be abstracted as a unidirectional channel with its error rate of 0-5%, wherein the maximum length of information to be transferred is 68 bytes. In such a case, if not using error correction algorithm, it is hard to assurance the completion of sending information in limited times. In some embodiments, the accumulation error correction algorithm is used to assurance the completion of transmission in limited times. Theoretical base of the accumulation error correction algorithm is that in multiple processes of sending data the error probability of data on the same bit is very low. Therefore multiple results of transferring data may be accumulated and analyzed. For a bit with large probability of error data in one process, its corresponding correct value may be found in other processes, thereby assuring the completion of sending information in limited times.

Assuming the length of information to be transferred is 68 bytes, in worst case, the probability of successful information sending is calculated with the accumulation error correction algorithm and without accumulation error correction algorithm, and the relationship between the results and times of sending is shown in FIG. 18. Assuming the error rate in transferring a byte is 5%, if 68 bytes of data is needed to be transferred, then the probability of successful transferring in one process is: $(1-0.05)^{68}=3\%$. In the case that the foregoing error correction algorithm is used, the probability of successful transferring in one process is also 3%, and the probability of successful transferring in n processes is: $(1-0.05^n)^{68}$.

The transmission rate of the embodiment depends on the sending rate of the UDP broadcast packet in master device. Currently, the frequency of sending broadcast packets is ⅕ ms, so that the transmission rate is 200 bytes/s. In the case that the identification field will not be calculated, the efficiency of loading is 66.7%. If the length of information sent is 68 bytes which is the longest, in the worst case, the information sending may be completed in 5 times at most, and the transmission time at most is 68/66.7*5/200=2.549s.

In other embodiments, the data packet also may is in Ethernet 802.2 format. FIG. 19 is the schematic diagram of the data packet in Ethernet 802.2 format, wherein, the header field is the length field in the data packet in the format of 802.2 SNAP, the others are the same as those in the data packet according to the embodiment of Ethernet 802.2 SNAP. The field Length in FIG. 19 represents the length of following data, which is above-mentioned length field. The field DA represents target MAC address, the field SA represents source MAC address, the field LLC represents LLC head, data field is the load, and the field FCS represents the frame check sequence.

The data packet also may is in Ethernet 802.3 format. FIG. 20 is the schematic diagram of the data packet in Ethernet 802.3 format, wherein, the header field is the length field in the data packet in the format of Ethernet 802.3, the others are the same as those in the data packet according to the embodiment of Ethernet 802.2 SNAP. The field Length in FIG. 20 represents the length of following data, which is above-mentioned length field. The field DA represents target MAC address, the field SA represents source MAC address, data field is the load, and the field FCS represents the frame check sequence.

The data packet also may be in Ethernet 802.3 SNAP format. Referring to FIG. 9, the schematic diagram of the data packet in Ethernet 802.3 SNAP format is the same as those in the data packet according to the embodiment of Ethernet 802.2 SNAP format, wherein, the header field is the length field in the data packet in the format of Ethernet 802.3 SNAP.

FIG. 21 illustrates a flow chart of an exemplary data communication method that transfers data via data packet headers in accordance with some embodiments.

Figure 22:
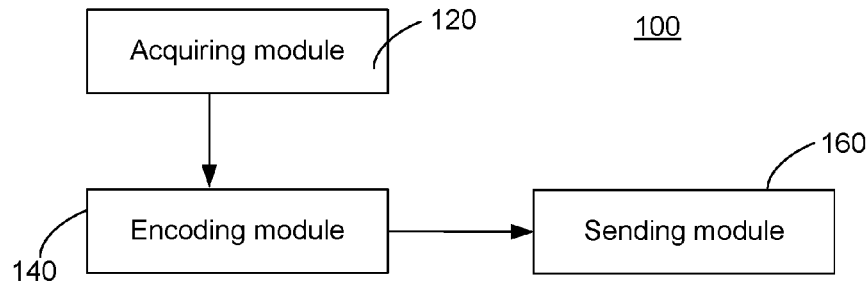
FIG. 22 is a block diagram of an exemplary data communication system in an electronic device (i.e., a master device) in accordance with some embodiments.

FIG. 22 is a block diagram of an exemplary data communication system in an electronic device (i.e., a master device) in accordance with some embodiments. The embodiment may be particularly applied to perform wireless communication with a receiver device which is in hybrid mode for monitoring the wireless signal in the space, especially may applied to transfer information to a receiver device which has no substantial connection with other devices. As shown in FIG. 22, the information sending apparatus 100 of the embodiment includes following modules.

Acquiring module 120, used for acquiring interested data to be sent. The interested data is the user data which needed to be send to receiver devices for wireless communication, but not the transmission control data automatically generated by the system for transmission process.

The interested data, for example, may be a service set identifier (SSID) and a password required at wireless access, and adjustment parameter of an intelligent air-conditioner. The interested data may be acquired by receiving user input, may be acquired through network, or may be acquired from a local memory of the information sending apparatus 100.

Encoding module 140, used for encoding the interested data in the header field to generate a data packet, wherein, the header field is a field in the data packet which may directly monitored. The header field in which the content can be directly monitored refers to a field for exposing specific content in a wireless transmission procedure. As long as within the coverage of signal, any receiver device having wireless transmission function can obtain the specific concrete content of the header field, even though without the password of the wireless communication.

In many wireless communication modes, some information in a data packet are not necessary to be secreted, for example the length field and the like in data packet of 802.2 SNAP format, which are exposed directly. The interested data may be transmitted in plaintext or transmitted with additional encryption, wherein the password for the encryption channel is different to the password for encrypting the interested data. If the interested data is encrypted, the receiver device may perform corresponding decryption, wherein the content of the interested data may be directly obtained without influence from the encryption channel.

Sending module 160, used for sending the data packet. Particularly, the data packet is sent, for example, by using given frequency, power and the like according to the requirement of wireless communication after the data packet is generated. If the channel for sending data packet is encrypted, the data packet is sent through the encryption channel.

In foregoing information sending apparatus 100, by using the header field in a data packet in which the content can be directly monitored, the interested data is encoded and sent out, and is received by the receiver device. With information sending apparatus 100, since the content of the header field encoded with the interested data may be directly monitored, the interested data may be obtained even though the contents of other fields in the data packet are encrypted and thus cannot be known, thereby realizing object to send information to a receiver device and receive and obtain the information by the receiver device. The receiver device may receive the interested data, without need of arrangement in advance to establish a connection with environment.

For the signal carrier, Wi-Fi wireless signal may be adopted for information transfer. Preferred, all channels of 1 to 14 may be used for support. By using the header field in a data packet in which the content can be directly monitored, the interested data is encoded. The receiver device may be in hybrid mode to monitor the wireless signal in the space, thereby enabling monitoring the header field in which the content can be directly monitored, and obtaining the interested data by decoding the header field. The information sending apparatus 100 is preferably suitable for transmission of minor data, which may applied in wireless terminals such as mobile phones and tablet computers having capability of wireless sending to send service set identifiers and passwords to intelligent control chips of Internet of Things on intelligent devices. In sending module 160, the data packet may be a broadcast packet, which is forwarded to receiver devices through wireless access point. The wireless access point has large power, so that the coverage area of signal physical space of wireless communication may be increased by its forwarding.

In some embodiments, the header field is a field which may directly controlled by normal application. Because of the limitation of operating system (e.g., iOS or Android) of a mobile terminal, a control authority of very high level is needed for the control for a field in which the content can be directly monitored, thus those applications for coding is hard to get those control. If a field that can be directly controlled by normal applications is selected as the header field, a control authority of very high level is not needed to carry out the application of the embodiment, which is not only convenient for use but also keep the security of the system. In some embodiments, the data packet may be in the format of 802.2 SNAP, the header field is the length field in the data packet in the format of 802.2 SNAP. 802.11 is a wireless LAN protocol set by IEEE, with which the IP packet is carried by the logic link control packaging of 802.2, therefore the wireless network data may be received with 802.2 SNAP format. If the hybrid mode of Wi-Fi chip is enabled, the data packet as shown in FIG. 9 may be obtained by monitoring the wireless signal in space and intercepting the data from the data link layer with 802.2 SNAP format.

The header field "Length" in FIG. 9 represents the length of following data, which is above-mentioned length field.

The field DA represents target MAC address, the field SA represents source MAC address, the field LLC represents LLC head (Logical Link Control), and the field SNAP includes a vendor code of 3 bytes and a protocol type identification of 2 bytes. DATA area (data area) is the load, which is ciphertext with respect to a encryption channel, and a receiver device cannot know the specific content of the data area before obtaining the password of the encryption channel. The field FCS represents frame checking sequence. With respect to the monitor of the wireless signal namely the receiver device, the fields DA, SA, Length, LLC, SNAP, FCS are always exposed regardless the encryption of the wireless channel, which may be directly monitored. However, with respect to the master device which carry out the method of the embodiment, the control on the five fields DA, SA, LLC, SNAP, FCS needs a control authority of very high level because of the limitation of the operating system (e.g., iOS or Android), the application for coding in the master device generally is hard to get it.

Therefore, by using the header field "Length" in which the content can be directly monitored and controlled by many software applications, an application for coding in the master device gains convenient control to send data in the header field "Length" of the data packet as needed.

In some embodiments, the data packet is based on a user datagram protocol (UDP). The master devices uses the UDP broadcast packet to carry interested data and specifically, sends a series of UDP broadcast packets in which the respective header field "length" of each packet is encoded with the interested data. The receiver device monitors the wireless signal in space in a hybrid mode, intercepts the data packets that are configured in a 802.2 SNAP format, obtains data in the encoded header fields "Length" of the intercepted data packets, and retrieves the interested data (i.e., the interested data) by decoding the obtained data in the encoded header fields. In some embodiments, the data packet has a data format that complies with a transmission control protocol (TCP).

In some embodiments, due to a limitation for maximum transmission units (MTU), the maximum number of bits that can be used to carry the interested data in the header field "Length" is 10. However, the packet loss rate is normally proportional to the length of the UDP packet. When the header field "Length" provides more than 9 bits for carrying the interested data or the corresponding UDP packet has more than 256 bits, the packet loss rate of the UDP broadcast packet substantially increases, and a loss of order among different packets often occurs. Therefore, in some preferred embodiments, the number of bits is limited to 8 for some header fields that are used for carrying interested data, and the UDP broadcast packet is controlled to have a length of no more than 256 bits. In these circumstances, each UDP data packet includes one byte of interested data that is conveniently readable by the receiver device. Given such limited data amount in each data packet, the interested data may need multiple UDP data packets to be completely transferred from the master device to the receiver device.

Since each data packet can carry fewer data, in some embodiments, one whole interested data is sent through a data packet set consisting of a plurality of data packets. Particularly, the step of encoding the interested data in the header field to generate a data packet (wherein the header field is a field in the data packet in which the content can be directly monitored) comprises:

generating a control field for being identified and a data field for loading a interested data according to the interested data.

sequentially encoding the control field and the data field in the header fields of a plurality of data packets to generate a plurality of data packets. By using the control field and data field, in the case that a single data packet has limited interested data amount, a data transmission with its data amount larger than that of a single data packet may be realized by means of a data packet set.

Referring to FIG. 11, which is a schematic diagram of the link layer data structure of the information sent by the information sending apparatus 100. The link layer data structure is divided into two classes: a control field (i.e., field for controlling specifications) and a data field (i.e., field for carrying data). In some embodiments, the control field includes a magic code field (i.e., recognition field) 1200, a prefix code field (i.e., prefix field) 1104, and a sequence header field (i.e., sequence header field) 1300. In the control fields, the identification field 1200 is used for identifying the upcoming interested data, and the prefix field 1104 has a similar function as the identification field except that it precedes a sequence header field 1300 and represents a formal start of a plurality of data sequence.

The data field 1400 includes the sequence header field which is used for loading a check code of the check data. The data field 1400 further includes the sequence field used for loading the interested data. When each header field of a data packet used for carrying the interested data includes a byte (or 8 bits), the control field and the data field are distinguished by the 7th bit of a byte (sometimes called a control bit). Specifically, in one example, the 7th bit of "1" represents data field, and "0" represents control field. In other embodiments, any other bit may be used for the control bit for identifying the control field and the data field, wherein the codes of the control bit in the byte of the control field and the data field are distinct. The bit may be any one of 0th bit to 7th bit. In some embodiments, 0 may represents the data fields, and 1 represents the control fields. The magic code field and sequence header field are distinguished by the 6th bit, and 1 represents the sequence header field while 0 represents the identification field. In other embodiments, other bit(s) may also be used for identifying the magic code field. In some embodiments, 0 may represents the sequence header field, and 1 represents the identification field.

Referring to FIG. 12, an identification field 1200 includes magic codes (i.e., identification byte), each magic code or identification byte includes magic (i.e., identification code) 1202 for identifying the magic code and information (i.e., information code) 1204 for loading information. In some embodiments, the identification field 1200 includes 4 bytes, wherein the higher 4 bits of each byte include the identification code 1202 and the lower 4 bits include the information code 1204. In one specific example, the first two bytes of the information code 1202 carry the higher 4 bits and lower 4 bits of the length of the data to be sent, respectively, and the last two bytes of the information code 1202 respectively carry the higher 4 bits and the lower 4 bit of the CRC8 (circular redundancy check code) value of the data to be sent. When data communication method 80 is used to transfer a SSID and a SSID password of a Wi-Fi network, the CRC8 code of the SSID in the identification field 1200 improves the entire transmission procedure. In some implementations, before the receiver device receives data, the wireless access points (APs) is scanned to obtain the SSID, RSSI (received signal strength indicator) and channels of all non-hide APs in the wireless environment. During the subsequent data communication process, the receiver device first acquires the CRC8 value associated with the SSID of a target AP, and then compares it with the CRC8 value of the SSID obtained from a previous scan. If these two CRC values match, the receiver device will not need to receive the SSID information again and thereby shorten the transmission time.

In some embodiments, a predetermined number of bytes (e.g., 20) are sent for identification fields 1200. The wireless network environment in which the receiver device locates may be complicated. Specifically, there would be multiple APs in the same space, and these APs may be distributed on same or different channels. Therefore, initially, the receiver device does not recognize which channel of 1 to 14 is used by the master device to send information and which of numerous devices on a specific channel is associated with the master device. In this situation, the receiver device could receive huge amount of data provided by different devices from different channels.

In order to find out the channel used by the master device and the physical address (i.e., MAC address) of the master device from the huge amount of data, the master device may send a predetermined number of bytes as identification fields 1200 before sending other information. Each of these identification fields 1200 includes 4 bytes, and is used to identify the master device. Therefore, the receiver device can know and focus on the MAC address and the channel of the master device, and use them in subsequent information monitoring procedure to effectively filter the huge amount of data.

Referring to FIG. 13, in some embodiments, the sequence header field 1300 includes sequence CRC8 (i.e., sequence circular redundancy check code) 1302 and sequence index (i.e., sequence index) 1304. Each data sequence field 1102 also includes a number of bytes in a respective data field used for loading the interested data. A sequence header field 1300 and a sequence data field 1400 forms a data sequence field 1102, and the interested data may be carried by a plurality of data sequence fields 1102. In some embodiments, the interested data to be sent are divided with the grain size of 4 bytes (padding with 0 will be needed if the length of the interested data cannot be exactly divided), each 4 sequence bytes are loaded to a data sequence field 1102, and the data is sent in unit of data sequences. Furthermore, in some embodiments, the interested data is sent for predetermined times in order to correct errors. After the interested data is sent at the first time, i.e., after the N sequences including said interested data are sent at the first time, and before start to send N sequences again, a prefix field 1104 is sent for one time to represent the start of N sequences. That is to say, when sending repeatedly, the data packet includes prefix field 1104, sequence header field 1300 and data field 1400, wherein the identification field 1200 is optional. In some embodiments, the sequence header field 1300 includes two bytes, wherein the lower six bits of the first byte carry the CRC8 of all sent data from the start of the sequence index 1304 to the end of the sequence. After receiving a sequence of data, check for the CRC8 value is performed. If the CRC value is not consistent with a previously scanned CRC value, the sequence of data is received with errors and thereby discarded.

Referring to FIG. 14, in some embodiments, the sequence data field 1400 includes 4 bytes, the 7th bit of each byte is the control bit and is fixed as 1, and the rest 7 bits are used for loading interested data. In some embodiments, the interested data include one of more of the SSID, the SSID password, and a random number used for confirming the reception of the interested data. In some implementations, after an AP is connected, the master device immediately sends a UDP broadcast packet containing a random number.

The receiver device is supposed to return the random number to the master device, and it can be determined that the receiver device has received the interested data correctly, when the master device has received the random number without any error. The size of the random number is one byte, and thus, its value is smaller than 127. In some embodiments, the SSID and the SSID password are ended with '\0' and encrypted based on a lookup table or a dictionary, and the corresponding receiver device may use the same lookup table or dictionary to decrypt the received SSID and SSID password.

Further as shown in FIG. 15, according to a sending order, the master device sequentially sends the SSID password, the random number and the SSID. In some embodiments, the receiver device acquires the CRC8 value of the SSID of a target AP in the identification field 1200, and compares it with the CRC8 value of the SSID that was previously obtained. When theses two CRC8 values are consistent, the SSID information is verified, and the receiver device does not need to process the subsequent SSID information, thereby reducing the transmission time and improving the corresponding transmission efficiency.

Figure 23:
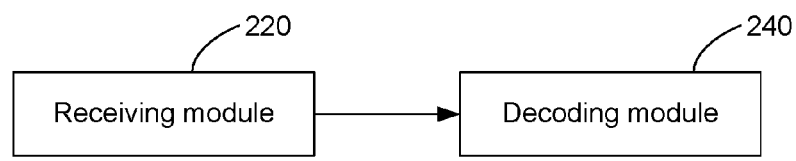
FIG. 23 is a block diagram of an exemplary data processing system in an electronic device (i.e., a receiver device) in accordance with some embodiments.

FIG. 23 is a block diagram of an exemplary data processing system in an electronic device (i.e., a receiver device) in accordance with some embodiments. The information receiving apparatus of the embodiment may be applied to monitor the wireless signal in the space with a hybrid mode. The information receiving apparatus 200 may carries out wireless communication with wireless terminals such as mobile phones and tablet computers having capability of wireless sending. Especially may applied to receive information in the case that the receiver device has no substantial connection with other devices. As shown in FIG. 23, the information receiving apparatus 200 of the embodiment includes following modules.

Receiving module 220, used for receiving data packets generated by encoding the interested data in the header field, wherein, the header field is a field in the data packet which may directly monitored. The step corresponds to sending module 160, and will not be described repeatedly. For the data packet transmitted on the encryption channel, the data packet is acquired on the encryption channel.

Decoding module 240, used for decoding the header field to obtain the interested data. The interested data may be obtained through decoding according to the format corresponding to the encoding. For the data packet transmitted through a encryption channel, in which although the data area of the data packet is encrypted and thus the specific content cannot be known, the header field is a field of the data packet in which the content can be directly monitored without influence of the encryption channel, so that the content in the header field can be obtained for decoding.

The information receiving apparatus 200 may be based on Wi-Fi wireless communication protocol, is suitable for receiving minor data, and may be applied in the intelligent control chip of Internet of Things to receive SSID and password. For example, through this receiving mode, an intelligent switch without a key or touch screen for inputting a SSID may obtain the SSID and password conveniently and quickly. Above-mentioned data packet may be a broadcast packet, and may be received through forwarding by a wireless access point. The wireless access point has large power, so that the coverage area of signal physical space of wireless communication may be increased by its forwarding. The receiving module 220 monitors the wireless signal in space with a hybrid mode, intercepts data in data link layer, and obtains the data packet.

As for the data packet and the header field, please referring to the embodiments shown in FIG. 8 to FIG. 15. The data packet is packaged and encrypted by a master device in an IP layer and a data link layer. Therefore, the step S240 includes a step for modifying the header field "Length." In some embodiments, the data packet is sent as a UDP broadcast packet on a UDP layer, and the data packet of the UDP layer is packaged in an IP layer and a data link layer, but encrypted based on WPA2, WPA or WEP by the master device. Due to the need of packaging and encryption, extra bytes are added to each data packet. Thus, the length of the UDP broadcast packet sent by the master device will be different with the value of the header field "Length" monitored finally by the receiver device, therefore modification is needed. It is found that: as long as the length of the UDP broadcast packet is within the limitation range of the MTU (i.e., the UDP packet will not be intersected), the difference between the length of the UDP broadcast packet sent by the master device and the value of the header field "Length" monitored finally by the receiver device is a constant value. And the constant value will not change along with the length change of the UDP broadcast packet, and rather, is merely associated with the Wi-Fi encryption method used to encrypt the data packet. Therefore, as long as the value of the difference under different encryption manner is known, the receiver device can track the header field "Length" accurately.

Through a series of experiments, a modification table is obtained as shown in FIG. 17. AES is the abbreviation of Advanced Encryption Standard, it is an advanced encryption standard. TKIP is the abbreviation of Temporal Key Integrity Protocol, which means temporary key integrity protocol. RC4 is a stream encryption algorithm with variable key length. If Wi-Fi encryption manner is WPA2 (AES), the receiver device intercept a UDP broadcast packet of 802.2 SNAP format in link layer through monitoring, the value of field Length is 152, the information receiving apparatus 200 modifies it and obtains the content sent by the master device as 152−52=100. Therefore, the step of modifying the length field is: subtracting preset modification value from the value of the length field.

In some embodiments, one reception of interested data is completed through receiving a data packet set composed of a plurality of data packets. Decoding module 240 decodes the plurality of data packets, to obtain the control field used for being identified and the data field used for loading interested data, which are sequentially encoded in the header fields of the plurality of data packets. The control fields include identification field and sequence header field, wherein the identification field is used for identification, and the sequence header field is used for decoding the obtained check code of the check data. The data fields include sequence field, and the sequence field is used for loading the interested data.

The sequence header field includes sequence circular redundancy check code, and sequence index. The sequence field includes sequence byte, and the sequence field is used for obtaining the interested data. After receiving a data packet set, check is performed through sequence circular redundancy check code. If the check fails, the sequence of data is proved to be received with errors, which should be discarded.

In some embodiments, a sequence header field and a sequence field consist a sequence, and the interested data may be transmitted by a plurality of sequences. The sequence header field includes two bytes, wherein the lower six bits of the first byte carry the CRC8 of all sent data from the start of the sequence index to the end of the sequence. After receiving a sequence of data, check for the CRC8 value is performed. If not same, the sequence of data is proved to be received with errors, which should be discarded.

Before receiving N sequences carrying the interested data at each time, the prefix field will be received, the SSID CRC8 of the SSID used for decoding may be obtained. Receiving module 220 is also used for scanning the APs in the environment, to obtain the environment service set identifier The environment service set identifier is checked with the SSID CRC8, if success, giving up receiving the SSID. Before the information receiving apparatus 200 receives data, the APs are scanned, wherein the SSID, RSSI (received signal strength indicator) and channels of all non-hide APs in the wireless environment may be obtained through acquired beacon. During transmission procedure, the information receiving apparatus 200 first acquires the CRC8 value of the SSID of a target AP, and then compares it with the CRC8 value of the SSID obtained by scanning previously. If same value is found, the information receiving apparatus 200 will not need to receive the SSID information again in the following procedure of reception, thereby significantly shortening the transmission time.

The communication model in the foregoing embodiment may be abstracted as a unidirectional channel with its error rate of 0-5%, wherein the maximum length of information to be transferred is 68 bytes. In such a case, if not using error correction algorithm, it is hard to assurance the completion of sending information in limited times. In some embodiments, the accumulation error correction algorithm is used to assurance the completion of transmission in limited times. Theoretical base of the accumulation error correction algorithm is that in multiple processes of sending data the error probability of data on the same bit is very low. Therefore multiple results of transferring data may be accumulated and analyzed. For a bit with large probability of error data in one process, its corresponding correct value may be found in other processes, thereby assuring the completion of sending information in limited times.

Assuming the length of information to be transferred is 68 bytes, in worst case, the probability of successful information sending is calculated with the accumulation error correction algorithm and without accumulation error correction algorithm, and the relationship between the results and times of sending is shown in FIG. 18. Assuming the error rate in transferring a byte is 5%, if 68 bytes of data is needed to be transferred, then the probability of successful transferring in one process is: $(1-0.05)^{68}=3\%$. In the case that the foregoing error correction algorithm is used, the probability of successful transferring in one process is also 3%, and the probability of successful transferring in n processes is: $(1-0.^{05n})^{68}$.

The transmission rate of the embodiment depends on the sending rate of the UDP broadcast packet in master device. Currently, the frequency of sending broadcast packets is ⅕ ms, so that the transmission rate is 200 bytes/s. In the case that the identification field will not be calculated, the efficiency of loading is 66.7%. If the length of information sent is 68 bytes which is the longest, in the worst case, the information sending may be completed in 5 times at most, and the transmission time at most is 68/66.7*5/200=2.549s.

In another embodiment, the data packet also may be in Ethernet 802.2 format. FIG. 19 is the schematic diagram of the data packet in Ethernet 802.2 format, wherein, the header field is the length field in the data packet in the format of 802.2 SNAP, the others are the same as those in the data packet according to the embodiment of Ethernet 802.2 SNAP. The field Length in FIG. 19 represents the length of following data, which is above-mentioned length field. The field DA represents target MAC address, the field SA represents source MAC address, the field LLC represents LLC head, data field is the load, and the field FCS represents the frame check sequence.

The data packet also may is in Ethernet 802.3 format. FIG. 20 is the schematic diagram of the data packet in Ethernet 802.3 format, wherein, the header field is the length field in the data packet in the format of Ethernet 802.3, the others are the same as those in the data packet according to the embodiment of Ethernet 802.2 SNAP. The field Length in FIG. 20 represents the length of following data, which is above-mentioned length field. The field DA represents target MAC address, the field SA represents source MAC address, data field is the load, and the field FCS represents the frame check sequence.

The data packet also may be in Ethernet 802.3 SNAP format. Referring to FIG. 9, the schematic diagram of the data packet in Ethernet 802.3 SNAP format is the same as those in the data packet according to the embodiment of Ethernet 802.2 SNAP format, wherein, the header field is the length field in the data packet in the format of Ethernet 802.3 SNAP.

Figure 24:
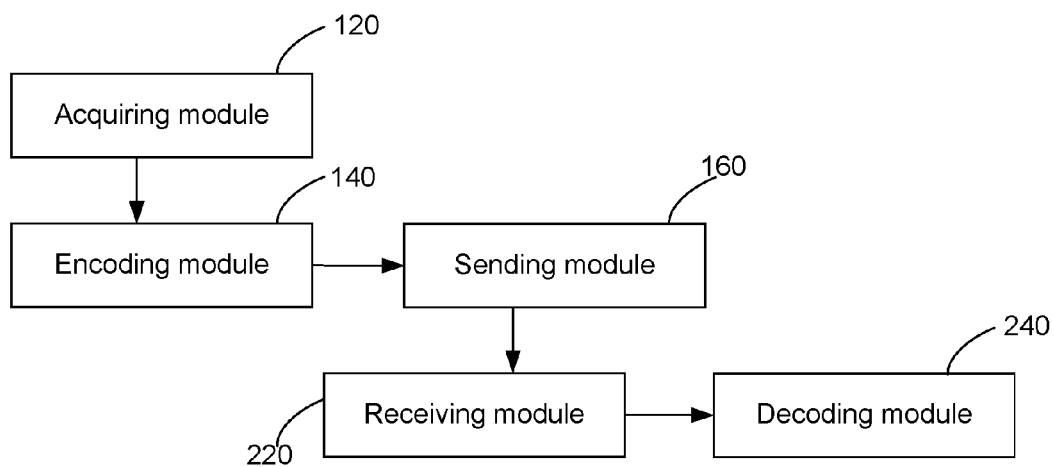
FIG. 24 is a block diagram of another exemplary data communication and processing system in accordance with some embodiments.

FIG. 24 is a block diagram of another exemplary data communication and processing system in accordance with some embodiments. The embodiment may be applied in receiver devices in hybrid mode to monitor wireless signal in space to perform wireless communication with terminals (e.g., mobile phone, tablet computer and etc.) that are capable of sending wireless signals. Especially may applied to receive information in the case that the receiver device has no substantial connection with other devices.

As shown in FIG. 24, the communication system of the embodiment includes following modules.

Acquiring module 120, used for acquiring interested data to be sent. The interested data is the user data which needed to be send to receiver devices for wireless communication, but not the transmission control data automatically generated by the system for transmission process.

The interested data, for example, may be a service set identifier (SSID) and a password required at wireless access, and adjustment parameter of an intelligent air-conditioner. The interested data may be acquired by receiving user input, may be acquired through network, or may be acquired from a local memory of the master device.

Encoding module 140, used for encoding the interested data in the header field to generate a data packet, wherein, the header field is a field in the data packet which may directly monitored. The header field in which the content can be directly monitored refers to a field for exposing specific content in a wireless transmission procedure. As long as within the coverage of signal, any receiver device having wireless transmission function can obtain the specific concrete content of the header field, even though without the password of the wireless communication.

In many wireless communication modes, some information in a data packet are not necessary to be secreted, for example the length field and the like in data packet of 802.2 SNAP format, which are exposed directly.

Sending module 160, used for sending the data packet. Particularly, the data packet is sent, for example, by using given frequency, power and the like according to the requirement of wireless communication after the data packet is generated. If the channel for sending data packet is encrypted, the data packet is sent through the encryption channel.

Receiving module 220, used for receiving data packet. Corresponding to the sending module 160, receiving the data packet sent by the sending module 160. For the data packet transmitted on the encryption channel, the data packet is acquired on the encryption channel.

Decoding module 240, used for decoding the header field to obtain the interested data. The interested data may be obtained through decoding according to the format corresponding to the encoding. For the data packet transmitted through a encryption channel, in which although the data area of the data packet is encrypted and thus the specific content cannot be known, the header field is a field of the data packet in which the content can be directly monitored without influence of the encryption channel, so that the content in the header field can be obtained for decoding.

In foregoing communication system, by using the header field in a data packet in which the content can be directly monitored, the interested data is encoded and sent out, and is received by the receiver device. With foregoing communication system, since the content of the header field encoded with the interested data may be directly monitored, the interested data may be obtained even though the contents of other fields in the data packet are encrypted and thus cannot be known, thereby realizing object to send information to a receiver device and receive and obtain the information by the receiver device. The receiver device may receive the interested data, without need of arrangement in advance to establish a connection with environment.

For the signal carrier, Wi-Fi wireless signal may be adopted for information transfer. Preferred, all channels of 1 to 14 may be used for support. By using the header field in a data packet in which the content can be directly monitored, the interested data is encoded. The receiver device may be in hybrid mode to monitor the wireless signal in the space, thereby enabling monitoring the header field in which the content can be directly monitored, and obtaining the interested data by decoding the header field. The communication system of the embodiment is preferably suitable for transmission of minor data, which may applied in wireless terminals such as mobile phones and tablet computers having capability of wireless sending to send service set identifiers and passwords to intelligent control chips of Internet of Things in intelligent devices. The data packet sent by the sending module 160 may be a broadcast packet, which is forwarded to receiver devices through wireless access point. The wireless access point has large power, so that the coverage area of signal physical space of wireless communication may be increased by its forwarding.

In some embodiments, the header field is a field which may directly controlled by normal application. Because of the limitation of operating system (e.g., iOS or Android) of a mobile terminal, a control authority of very high level is needed for the control for a field in which the content can be directly monitored, thus those applications for coding is hard to get those control. If a field that can be directly controlled by normal applications is selected as the header field, a control authority of very high level is not needed to carry out the application of the embodiment, which is not only convenient for use but also keep the security of the system. In some embodiments, the data packet may be in the format of 802.2 SNAP, the header field is the length field in the data packet in the format of 802.2 SNAP. 802.11 is a wireless LAN protocol set by IEEE, with which the IP packet is carried by the logic link control packaging of 802.2, therefore the wireless network data may be received with 802.2 SNAP format. If the hybrid mode of Wi-Fi chip is enabled, the data packet as shown in FIG. 9 may be obtained by monitoring the wireless signal in space and intercepting the data from the data link layer with 802.2 SNAP format.

The header field "Length" in FIG. 9 represents the length of following data, which is above-mentioned length field. The field DA represents target MAC address, the field SA represents source MAC address, the field LLC represents LLC head (Logical Link Control), and the field SNAP includes a vendor code of 3 bytes and a protocol type identification of 2 bytes. DATA area (data area) is the load, which is ciphertext with respect to a encryption channel, and a receiver device cannot know the specific content of the data area before obtaining the password of the encryption channel. The field FCS represents frame checking sequence. With respect to the monitor of the wireless signal namely the receiver device, the fields DA, SA, Length, LLC, SNAP, FCS are always exposed regardless the encryption of the wireless channel, which may be directly monitored. However, with respect to the master device which carry out the method of the embodiment, the control on the five fields DA, SA, LLC, SNAP, FCS needs a control authority of very high level because of the limitation of the operating system (e.g., iOS or Android), the application for coding in the master device generally is hard to get it.

Therefore, by using the header field "Length" in which the content can be directly monitored and controlled by many software applications, an application for coding in the master device gains convenient control to send data in the header field "Length" of the data packet as needed.

In some embodiments, the data packet is based on a user datagram protocol (UDP). The master devices uses the UDP broadcast packet to carry interested data and specifically, sends a series of UDP broadcast packets in which the respective header field "length" of each packet is encoded with the interested data. The receiver device monitors the wireless signal in space in a hybrid mode, intercepts the data packets that are configured in a 802.2 SNAP format, obtains data in the encoded header fields "Length" of the intercepted data packets, and retrieves the interested data (i.e., the interested data) by decoding the obtained data in the encoded header fields. In some embodiments, the data packet has a data format that complies with a transmission control protocol (TCP).

In some embodiments, due to a limitation for maximum transmission units (MTU), the maximum number of bits that can be used to carry the interested data in the header field "Length" is 10. However, the packet loss rate is normally proportional to the length of the UDP packet. When the header field "Length" provides more than 9 bits for carrying the interested data or the corresponding UDP packet has more than 256 bits, the packet loss rate of the UDP broadcast packet substantially increases, and a loss of order among different packets often occurs. Therefore, in some preferred embodiments, the number of bits is limited to 8 for some header fields that are used for carrying interested data, and the UDP broadcast packet is controlled to have a length of no more than 256 bits. In these circumstances, each UDP data packet includes one byte of interested data that is conveniently readable by the receiver device. Given such limited data amount in each data packet, the interested data may need multiple UDP data packets to be completely transferred from the master device to the receiver device.

Since each data packet can carry fewer data, in some embodiments, one whole interested data is sent through a data packet set consisting of a plurality of data packets. Particularly, the step of encoding the interested data in the header field to generate a data packet (wherein the header field is a field in the data packet in which the content can be directly monitored) includes:

generating a control field for being identified and a data field for loading a interested data according to the interested data.

sequentially encoding the control field and the data field in the header fields of a plurality of data packets to generate a plurality of data packets. By using the control field and data field, in the case that a single data packet has limited interested data amount, a data transmission with its data amount larger than that of a single data packet may be realized by means of a data packet set.

FIG. 11 is a schematic diagram of a link layer data structure that is used to arrange header fields (e.g., header field "Length") in data packet headers for loading interested data in accordance with some embodiments. The link layer data structure is divided into two classes: a control field (i.e., field for controlling specifications) and a data field (i.e., field for carrying data). In some embodiments, the control field includes a magic code field (i.e., recognition field) 1200, a prefix code field (i.e., prefix field) 1104, and a sequence header field (i.e., sequence header field) 1300. In the control fields, the identification field 1200 is used for identifying the upcoming interested data, and the prefix field 1104 has a similar function as the identification field except that it precedes a sequence header field 1300 and represents a formal start of a plurality of data sequence.

The data field 1400 includes the sequence header field which is used for loading a check code of the check data. The data field 1400 further includes the sequence field used for loading the interested data. When each header field of a data packet used for carrying the interested data includes a byte (or 8 bits), the control field and the data field are distinguished by the 7th bit of a byte (sometimes called a control bit). Specifically, in one example, the 7th bit of "1" represents data field, and "0" represents control field. In other embodiments, any other bit may be used for the control bit for identifying the control field and the data field, wherein the codes of the control bit in the byte of the control field and the data field are distinct. The bit may be any one of 0th bit to 7th bit. In some embodiments, 0 may represents the data fields, and 1 represents the control fields. The magic code field and sequence header field are distinguished by the 6th bit, and 1 represents the sequence header field while 0 represents the identification field. In other embodiments, other bit(s) may also be used for identifying the magic code field. In some embodiments, 0 may represents the sequence header field, and 1 represents the identification field.

Referring to FIG. 12, an identification field 1200 includes magic codes (i.e., identification byte), each magic code or identification byte includes magic (i.e., identification code) 1202 for identifying the magic code and information (i.e., information code) 1204 for loading information. In some embodiments, the identification field 1200 includes 4 bytes, wherein the higher 4 bits of each byte include the identification code 1202 and the lower 4 bits include the information code 1204. In one specific example, the first two bytes of the information code 1202 carry the higher 4 bits and lower 4 bits of the length of the data to be sent, respectively, and the last two bytes of the information code 1202 respectively carry the higher 4 bits and the lower 4 bit of the CRC8 (circular redundancy check code) value of the data to be sent. When data communication method 80 is used to transfer a SSID and a SSID password of a Wi-Fi network, the CRC8 code of the SSID in the identification field 1200 improves the entire transmission procedure. In some implementations, before the receiver device receives data, the wireless access points (APs) is scanned to obtain the SSID, RSSI (received signal strength indicator) and channels of all non-hide APs in the wireless environment. During the subsequent data communication process, the receiver device first acquires the CRC8 value associated with the SSID of a target AP, and then compares it with the CRC8 value of the SSID obtained from a previous scan. If these two CRC values match, the receiver device will not need to receive the SSID information again and thereby shorten the transmission time.

In some embodiments, a predetermined number of bytes (e.g., 20) are sent for identification fields 1200. The wireless network environment in which the receiver device locates may be complicated. Specifically, there would be multiple APs in the same space, and these APs may be distributed on same or different channels. Therefore, initially, the receiver device does not recognize which channel of 1 to 14 is used by the master device to send information and which of numerous devices on a specific channel is associated with the master device. In this situation, the receiver device could receive huge amount of data provided by different devices from different channels.

In order to find out the channel used by the master device and the physical address (i.e., MAC address) of the master device from the huge amount of data, the master device may send a predetermined number of bytes as identification fields 1200 before sending other information. Each of these identification fields 1200 includes 4 bytes, and is used to identify the master device. Therefore, the receiver device can know and focus on the MAC address and the channel of the master device, and use them in subsequent information monitoring procedure to effectively filter the huge amount of data.

Referring to FIG. 13, in some embodiments, the sequence header field 1300 includes sequence CRC8 (i.e., sequence circular redundancy check code) 1302 and sequence index (i.e., sequence index) 1304. Each data sequence field 1102 also includes a number of bytes in a respective data field used for loading the interested data. A sequence header field 1300 and a sequence data field 1400 forms a data sequence field 1102, and the interested data may be carried by a plurality of data sequence fields 1102. In some embodiments, the interested data to be sent are divided with the grain size of 4 bytes (padding with 0 will be needed if the length of the interested data cannot be exactly divided), each 4 sequence bytes are loaded to a data sequence field 1102, and the data is sent in unit of data sequences. Furthermore, in some embodiments, the interested data is sent for predetermined times in order to correct errors. After the interested data is sent at the first time, i.e., after the N sequences including said interested data are sent at the first time, and before start to send N sequences again, a prefix field 1104 is sent for one time to represent the start of N sequences. That is to say, when sending repeatedly, the data packet includes prefix field 1104, sequence header field 1300 and data field 1400, wherein the identification field 1200 is optional. In some embodiments, the sequence header field 1300 includes two bytes, wherein the lower six bits of the first byte carry the CRC8 of all sent data from the start of the sequence index 1304 to the end of the sequence. After receiving a sequence of data, check for the CRC8 value is performed. If the CRC value is not consistent with a previously scanned CRC value, the sequence of data is received with errors and thereby discarded.

Referring to FIG. 14, in some embodiments, the sequence data field 1400 includes 4 bytes, the 7th bit of each byte is the control bit and is fixed as 1, and the rest 7 bits are used for loading interested data. In some embodiments, the interested data include one of more of the SSID, the SSID password, and a random number used for confirming the reception of the interested data. In some implementations, after an AP is connected, the master device immediately sends a UDP broadcast packet containing a random number. The receiver device is supposed to return the random number to the master device, and it can be determined that the receiver device has received the interested data correctly, when the master device has received the random number without any error. The size of the random number is one byte, and thus, its value is smaller than 127. In some embodiments, the SSID and the SSID password are ended with '\0' and encrypted based on a lookup table or a dictionary, and the corresponding receiver device may use the same lookup table or dictionary to decrypt the received SSID and SSID password.

Further as shown in FIG. 15, according to a sending order, the master device sequentially sends the SSID password, the random number and the SSID. In some embodiments, the receiver device acquires the CRC8 value of the SSID of a target AP in the identification field 1200, and compares it with the CRC8 value of the SSID that was previously obtained. When theses two CRC8 values are consistent, the SSID information is verified, and the receiver device does not need to process the subsequent SSID information, thereby reducing the transmission time and improving the corresponding transmission efficiency.

The receiver device of the embodiment may be based on Wi-Fi wireless communication protocol, is suitable for receiving minor data, and may be applied in the intelligent control chip of Internet of Things to receive SSID and password. For example, through this receiving mode, an intelligent switch without a key or touch screen for inputting a SSID may obtain the SSID and password conveniently and quickly. Above-mentioned data packet may be a broadcast packet, and may be received through forwarding by a wireless access point. The wireless access point has large power, so that the coverage area of signal physical space of wireless communication may be increased by its forwarding. The receiving module 220 monitors the wireless signal in space with a hybrid mode, carries out the step of receiving data packet. Receiving module 220 intercepts the data in data link layer and obtains data packet.

Before sending, the data packet is packaged and encrypted in IP layer and data link layer. The decoding module 240 is also used for modifying the length field. In some embodiments, the data packet is sent as UDP broadcast packet. A data packet of UDP layer is first packaged in IP layer and data link layer, encrypted (in manners of WPA2, WPA or WEP) and then is sent out. In this way, the length of UDP broadcast packet sent by the master device will be different with the value of the header field "Length" monitored finally by the receiver device, therefore modification is needed. It is found that: as long as the length of the UDP broadcast packet is within the limitation range of the MTU (i.e., the UDP packet will not be intersected), the difference between the length of the UDP broadcast packet sent by the master device and the value of field Length monitored finally by the receiver device is a constant value. And the constant value will not change along with the length change of the UDP broadcast packet, and is only associated with the Wi-Fi encryption manner for the channel. Therefore, as long as the value of the difference under different encryption manner is found out, the receiver device can modify the header field "Length".

Through a series of experiments, a modification table is obtained as shown in FIG. 17. AES is the abbreviation of Advanced Encryption Standard, it is an advanced encryption standard. TKIP is the abbreviation of Temporal Key Integrity Protocol, which means temporary key integrity protocol. RC4 is a stream encryption algorithm with variable key length. If Wi-Fi encryption manner is WPA2 (AES), the receiver device intercept a UDP broadcast packet of 802.2 SNAP format in link layer through monitoring, the value of field Length is 152, the receiver device modifies it and obtains the content sent by the master device as 152−52=100. Therefore, the step of modifying the length field is: subtracting preset modification value from the value of the length field.

In some embodiments, one reception of interested data is completed through receiving a data packet set composed by a plurality of data packets. Decoding module 240 decodes the plurality of data packets, to obtain the control field used for being identified and the data field used for loading interested data, which are sequentially encoded in the header fields of the plurality of data packets. The control fields include identification field and sequence header field, wherein the identification field is used for identification, and the sequence header field is used for decoding the obtained check code of the check data. The data fields include sequence field, and the sequence field is used for loading the interested data.

The sequence header field includes sequence circular redundancy check code, and sequence index. The sequence field includes sequence byte, and the sequence field is used for obtaining the interested data. After receiving a data packet set, check is performed through sequence circular redundancy check code. If the check fails, the sequence of data is proved to be received with errors, which should be discarded.

In some embodiments, a sequence header field and a sequence field consist a sequence, and the interested data may be transmitted by a plurality of sequences. The sequence header field includes two bytes, wherein the lower six bits of the first byte carry the CRC8 of all sent data from the start of the sequence index to the end of the sequence. After receiving a sequence of data, check for the CRC8 value is performed. If not same, the sequence of data is proved to be received with errors, which should be discarded.

Before receiving N sequences carrying the interested data at each time, the prefix field will be received, the SSID CRC8 of the SSID used for decoding may be obtained. The communication system of the embodiment also includes scanning the APs in the environment to obtain an environment service set identifier. The environment service set identifier is checked with the SSID CRC8, if success, giving up receiving the SSID. Before the receiver device receives data, the wireless access points (APs) is scanned, wherein the SSID, RSSI (received signal strength indicator) and channels of all non-hide APs in the wireless environment may be obtained through acquired beacon. During transmission procedure, the receiver device first acquires the CRC8 value of the SSID of a target AP, and then compares it with the CRC8 value of the SSID obtained by scanning previously. If same value is found, the receiver device will not need to receive the SSID information again in the following procedure of reception, thereby significantly shortening the transmission time.

The communication model in the foregoing embodiment may be abstracted as a unidirectional channel with its error rate of 0-5%, wherein the maximum length of information to be transferred is 68 bytes. In such a case, if not using error correction algorithm, it is hard to assurance the completion of sending information in limited times. In some embodiments, the accumulation error correction algorithm is used to assurance the completion of transmission in limited times. Theoretical base of the accumulation error correction algorithm is that in multiple processes of sending data the error probability of data on the same bit is very low. Therefore multiple results of transferring data may be accumulated and analyzed. For a bit with large probability of error data in one process, its corresponding correct value may be found in other processes, thereby assuring the completion of sending information in limited times.

Assuming the length of information to be transferred is 68 bytes, in worst case, the probability of successful information sending is calculated with the accumulation error correction algorithm and without accumulation error correction algorithm, and the relationship between the results and times of sending is shown in FIG. 18. Assuming the error rate in transferring a byte is 5%, if 68 bytes of data is needed to be transferred, then the probability of successful transferring in one process is: $(1-0.05)^{68}=3\%$. In the case that the foregoing error correction algorithm is used, the probability of successful transferring in one process is also 3%, and the probability of successful transferring in n processes is: $(1-0.05^n)^{68}$.

The transmission rate of the embodiment depends on the sending rate of the UDP broadcast packet in master device. Currently, the frequency of sending broadcast packets is ⅕ ms, so that the transmission rate is 200 bytes/s. In the case that the identification field will not be calculated, the efficiency of loading is 66.7%. If the length of information sent is 68 bytes which is the longest, in the worst case, the information sending may be completed in 5 times at most, and the transmission time at most is 68/66.7*5/200=2.549s.

In another embodiment, the data packet also may be in Ethernet 802.2 format. FIG. 19 is the schematic diagram of the data packet in Ethernet 802.2 format, wherein, the header field is the length field in the data packet in the format of 802.2 SNAP, the others are the same as those in the data packet according to the embodiment of Ethernet 802.2 SNAP. The field Length in FIG. 19 represents the length of following data, which is above-mentioned length field. The field DA represents target MAC address, the field SA represents source MAC address, the field LLC represents LLC head, data field is the load, and the field FCS represents the frame check sequence.

The data packet also may is in Ethernet 802.3 format. FIG. 20 is the schematic diagram of the data packet in Ethernet 802.3 format, wherein, the header field is the length field in the data packet in the format of Ethernet 802.3, the others are the same as those in the data packet according to the embodiment of Ethernet 802.2 SNAP. The field Length in FIG. 20 represents the length of following data, which is above-mentioned length field. The field DA represents target MAC address, the field SA represents source MAC address, data field is the load, and the field FCS represents the frame check sequence.

The data packet also may be in Ethernet 802.3 SNAP format. Referring to FIG. 9, the schematic diagram of the data packet in Ethernet 802.3 SNAP format is the same as those in the data packet according to the embodiment of Ethernet 802.2 SNAP format, wherein, the header field is the length field in the data packet in the format of Ethernet 802.3 SNAP.

The skilled in the art may understand that the whole or part flow of the methods in foregoing embodiments may performed by relevant hardware through the instruction of computer program. The program may be stored in computer readable storage medium, and may implement methods of foregoing embodiments when being carrying out. Wherein, the storage medium may be magnetic disc, optical disc, Read-Only Memory (ROM) or Random Access Memory (RAM) and the like.

Foregoing embodiments only express several implementation modes of the present application, which are specific and detailed, but is not intended to limit the protection range of the present application. For the skilled in the art, some modification and improvement may be made without departing from sprit of the present application, which will fall in the protection scope of the present application. Therefore, the protection scope of the present application should be determined by the claims.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present application. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A data communication method, comprising:
at an electronic device having one or more processors and memory storing program modules to be executed by the one or more processors:
obtaining a sequence of data packets, wherein each data packet complies with a first data format corresponding to a network access protocol and comprises a respective header that further includes a data length field for specifying a length of the respective data packet, the data length field including a first subset of bytes and a second subset of bytes that are distinct from each other and do not share any byte;
assigning the length of each data packet to the first subset of bytes; and
assigning data to the second subset of bytes of each of the data length fields of the sequence of data packets according to a second data format;
encrypting the sequence of data packets that include the assigned data; and
sending the sequence of encrypted data packets to a receiver device that is communicatively coupled to the electronic device via a wireless network, wherein the receiver device is configured to retrieve the assigned data from the second subset of bytes of the data length fields of the sequence of data packets according to the first and second data formats and perform operations in accordance with the retrieved data.

2. The method of claim 1, wherein the assigned data comprises an SSID and an SSID password, and the SSID identifies the wireless network that transmits the sequence of data packets and is accessible when the SSID password is verified.

3. The method of claim 2, wherein the assigned data further comprises a random number that is provided by the electronic device to the receiver device with the SSID and the SSID password, such that after receiving the SSID and the SSID password, the receiver device returns the random number to the electronic device to verify that it has received the SSID and the SSID password.

4. The method of claim 1, wherein the network access protocol associated with the sequence of data packets includes IEEE 802.2 SNAP.

5. The method of claim 1, wherein each data length field comprises eight bits of data.

6. The method of claim 1, wherein the sequence of encrypted data packets are sent to the receiver device via a wireless access point that is also communicatively coupled on the identified wireless network.

7. The method of claim 1, wherein obtaining the sequence of data packets further includes:
generating a user interface that comprises a plurality of user input spaces for receiving inputs from a user of the electronic device;
in accordance with a user input, displaying the sequence of data packets associated with the user input on the plurality of user input spaces; and
obtaining the sequence of data packets that are displayed in the corresponding user input spaces.

8. The method of claim 1, wherein in accordance with the second data format, the assigned data comprises a data control header that precedes a data field for specifying a plurality of characteristics associated with the assigned data, the data control header and the data field being assigned to the data length fields of a respective subset of data packets.

9. The method of claim 8, wherein in accordance with the second data format, the assigned data comprise a plurality of bytes, and each byte further comprises one or more control bits that identify whether the respective byte is associated with the data control header or the data field of the assigned data.

10. The method of claim 8, wherein in accordance with the second data format, the plurality of characteristics that are associated with the assigned data comprise validity of the assigned data, and one or more bytes of the data control header are associated with integrity data for the assigned data.

11. The method of claim 8, wherein in accordance with the second data format, the plurality of characteristics that are associated with the assigned data comprise a data length of the assigned data, and one or more bytes of the data control header are used to define the data length of the assigned data.

12. The method of claim 8, wherein in accordance with the second data format, the data control header further comprises one or more bytes that identify a start of the assigned data.

13. A data processing method, comprising:
at a receiver device having one or more processors and memory storing program modules to be executed by the one or more processors:
obtaining a sequence of data packets, wherein each data packet complies with a first data format corresponding to a network access protocol and comprises a respective header that further includes a data length field for specifying a length of the respective data packet, the data length field including a first subset of bytes and a second subset of bytes that are distinct from each other and do not share any byte;
assigning the length of each data packet to the first subset of bytes; and
assigning data to the second subset of bytes of each of the data length fields of the sequence of data packets according to a second data format;
encrypting the sequence of data packets that include the assigned data; and
sending the sequence of encrypted data packets to a receiver device that is communicatively coupled to the electronic device via a wireless network, wherein the receiver device is configured to retrieve the assigned data from the second subset of bytes of the data length fields of the sequence of data packets according to the first and second data formats and perform operations in accordance with the retrieved data.

14. The method of claim 13, wherein the retrieved data comprises an SSID and an SSID password, and the SSID identifies the wireless network that transmits the sequence of data packets and is accessible when the SSID password is verified.

15. The method of claim 14, wherein the retrieved data further comprises a random number that is provided by the electronic device to the receiver device with the SSID and the SSID password, such that after receiving the SSID and the SSID password, the receiver device returns the random number to the electronic device to verify that it has received the SSID and the SSID password.

16. The method of claim 13, wherein the network access protocol associated with the sequence of data packets includes IEEE 802.2 SNAP.

17. The method of claim 13, wherein each data length field comprises eight bits of data.

18. The method of claim 13, wherein in accordance with the second data format, the retrieved data comprises a data control header that precedes a data field for specifying a plurality of characteristics associated with the retrieved data, the data control header and the data field being assigned to the data length fields of a respective subset of data packets.

19. The method of claim 18, wherein in accordance with the second data format, the retrieved data comprise a plurality of bytes, and each byte further comprises one or more control bits that identify whether the respective byte is associated with the data control header or the data field of the assigned data.

20. An electronic device, comprising:
one or more processors; and
memory having instructions stored thereon, which when executed by the one or more processors cause the processors to perform operations comprising:
obtaining a sequence of data packets, wherein each data packet complies with a first data format corresponding to a network access protocol and comprises a respective header that further includes a data length field for specifying a length of the respective data packet, the data length field including a first subset of bytes and a second subset of bytes that are distinct from each other and do not share any byte;
assigning the length of each data packet to the first subset of bytes; and
assigning data to the second subset of bytes of each of the data length fields of the sequence of data packets according to a second data format;
encrypting the sequence of data packets that include the assigned data; and sending the sequence of encrypted data packets to a receiver device that is communicatively coupled to the electronic device via a wireless network, wherein the receiver device is configured to retrieve the assigned data from the second subset of bytes of the data length fields of the sequence of data packets according to the first and second data formats and perform operations in accordance with the retrieved data.

* * * * *